(12) United States Patent  
Flood et al.

(10) Patent No.: US 9,394,414 B2  
(45) Date of Patent: *Jul. 19, 2016

(54) ELASTIC, MOISTURE-VAPOR PERMEABLE FILMS, THEIR PREPARATION AND THEIR USE

(75) Inventors: John Flood, Cypress, TX (US); Richard Blackwell, Katy, TX (US); Martin Ehrlich, Houston, TX (US); Todd Schroeder, The Woodlands, MA (US); Jerzy Gumulka, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 527 days.

This patent is subject to a terminal disclaimer.

(21) Appl. No.: 12/893,145

(22) Filed: Sep. 29, 2010

(65) Prior Publication Data

US 2012/0077400 A1    Mar. 29, 2012

(51) Int. Cl.
  *C08L 25/08* (2006.01)
  *C08L 53/00* (2006.01)
  (Continued)

(52) U.S. Cl.
  CPC . *C08J 5/18* (2013.01); *B32B 5/245* (2013.01); *B32B 27/00* (2013.01); *B32B 27/12* (2013.01); *B32B 27/28* (2013.01); *B32B 27/302* (2013.01); *C08L 53/02* (2013.01); *C08L 53/025* (2013.01); *C09D 153/025* (2013.01); *B32B 2255/102* (2013.01); *B32B 2260/046* (2013.01);
  (Continued)

(58) Field of Classification Search
  CPC .................. B32B 2307/51; B32B 2307/724; C08J 5/18; C08J 2353/02; Y10T 442/2139

USPC .......................................................... 525/89
See application file for complete search history.

(56) References Cited

U.S. PATENT DOCUMENTS

| 2,854,425 A | 9/1958 | Bogel et al. |
| 3,113,986 A | 12/1963 | Breslow et al. |

(Continued)

FOREIGN PATENT DOCUMENTS

| CA | 716645 | 8/1965 |
| CA | 2377553 A1 | 2/2001 |

(Continued)

OTHER PUBLICATIONS

International Search Report and Written Opinion, dated Jan. 31, 2012.

(Continued)

*Primary Examiner* — Jennifer Chriss
*Assistant Examiner* — Camie Thompson
(74) *Attorney, Agent, or Firm* — Novak Druce Quigg LLP; Ekatherina Serysheva

(57) ABSTRACT

The present disclosure relates to films such as membranes and coatings and to coated articles. The films comprise a combination of at least one elastomeric styrenic block copolymer which is optionally functionalized with functional groups different from sulfonic acid or sulfonate ester functional groups, and at least one sulfonated block copolymer. Films comprising the optionally functionalized block copolymer(s) and the additional sulfonated block copolymer(s) are elastic and are moisture-vapor permeable, and thus useful as coatings in breathable clothing and footwear, industrial workwear including cleanroom coveralls, in medical applications such as wound dressings and protective clothing, for bed sheets and mattress or seat covers, and other non-apparel applications.

29 Claims, 1 Drawing Sheet

(51) Int. Cl.

| | | |
|---|---|---|
| *C08J 5/18* | (2006.01) | |
| *C09D 153/02* | (2006.01) | |
| *C08L 53/02* | (2006.01) | |
| *B32B 5/24* | (2006.01) | |
| *B32B 27/00* | (2006.01) | |
| *B32B 27/12* | (2006.01) | |
| *B32B 27/28* | (2006.01) | |
| *B32B 27/30* | (2006.01) | |

(52) U.S. Cl.
CPC ....... *B32B2307/51* (2013.01); *B32B 2307/724* (2013.01); *B32B 2307/7265* (2013.01); *B32B 2437/00* (2013.01); *B32B 2535/00* (2013.01); *C08J 2353/02* (2013.01); *C08L 2205/025* (2013.01); *Y10T 442/2139* (2015.04)

(56) References Cited

U.S. PATENT DOCUMENTS

| | | | |
|---|---|---|---|
| 3,135,716 | A | 6/1964 | Uraneck et al. |
| 3,149,182 | A | 9/1964 | Porter et al. |
| 3,150,209 | A | 9/1964 | Short et al. |
| 3,281,257 | A | 10/1966 | Shy |
| 3,450,795 | A | 6/1969 | Langer et al. |
| 3,577,357 | A | 5/1971 | Winkler |
| RE27,145 | E | 6/1971 | Jones |
| 3,595,942 | A | 7/1971 | Wald et al. |
| 3,634,549 | A | 1/1972 | Shaw et al. |
| 3,670,054 | A | 6/1972 | De La Mare et al. |
| 3,682,768 | A | 8/1972 | Adams et al. |
| 3,700,633 | A | 10/1972 | Wald et al. |
| 3,735,559 | A | 5/1973 | Salemme |
| 3,783,072 | A | 1/1974 | Korpman |
| 3,976,628 | A | 8/1976 | Halasa et al. |
| 3,985,830 | A | 10/1976 | Fetters et al. |
| 4,039,593 | A | 8/1977 | Kamienski et al. |
| 4,089,913 | A | 5/1978 | Miki et al. |
| 4,107,236 | A | 8/1978 | Naylor et al. |
| 4,122,134 | A | 10/1978 | Miki et al. |
| 4,145,298 | A | 3/1979 | Trepka |
| 4,145,490 | A | 3/1979 | Harris et al. |
| 4,190,566 | A | 2/1980 | Noll et al. |
| 4,226,952 | A | 10/1980 | Halasa et al. |
| 4,267,284 | A | 5/1981 | Kitchen |
| 4,313,867 | A | 2/1982 | Duvdenvani |
| 4,365,023 | A | 12/1982 | Fujimoto |
| 4,391,949 | A | 7/1983 | St. Clair |
| 4,409,537 | A | 10/1983 | Harris |
| 4,444,953 | A | 4/1984 | St. Clair |
| 4,578,429 | A | 3/1986 | Gergen et al. |
| 4,603,155 | A | 7/1986 | Muramori et al. |
| 4,678,025 | A | 7/1987 | Oberlander et al. |
| 4,766,161 | A | 8/1988 | Chlanda et al. |
| 4,797,318 | A | 1/1989 | Brooker et al. |
| 4,882,384 | A | 11/1989 | Willis et al. |
| 4,898,914 | A | 2/1990 | Gergen et al. |
| 4,909,429 | A | 3/1990 | Ankrom et al. |
| 4,931,070 | A | 6/1990 | Prasad |
| 4,934,148 | A | 6/1990 | Prasad et al. |
| 4,944,776 | A | 7/1990 | Keyser et al. |
| 4,946,899 | A | 8/1990 | Kennedy et al. |
| 4,970,265 | A | 11/1990 | Willis |
| 5,095,094 | A | 3/1992 | Brezin et al. |
| 5,145,748 | A | 9/1992 | Gaidis et al. |
| 5,191,024 | A | 3/1993 | Shibata et al. |
| 5,239,010 | A | 8/1993 | Balas et al. |
| 5,288,773 | A | 2/1994 | Gorbaty et al. |
| 5,306,779 | A | 4/1994 | Shibata et al. |
| 5,340,387 | A | 8/1994 | Smith |
| 5,346,964 | A | 9/1994 | Shibata et al. |
| 5,348,691 | A | 9/1994 | McElroy et al. |
| 5,389,711 | A | 2/1995 | Westbrook et al. |
| 5,468,574 | A | 11/1995 | Ehrenberg et al. |
| 5,506,299 | A | 4/1996 | Gelles et al. |
| 5,516,831 | A | 5/1996 | Pottick et al. |
| 5,620,500 | A | 4/1997 | Fukui et al. |
| 5,677,074 | A | 10/1997 | Serpico et al. |
| 5,679,482 | A | 10/1997 | Ehrenberg et al. |
| 5,679,745 | A | 10/1997 | Hamada et al. |
| 5,709,921 | A | 1/1998 | Shawer |
| 5,785,117 | A | 7/1998 | Grinbergs |
| 5,840,387 | A | 11/1998 | Berlowitz-Tarrant et al. |
| 5,905,097 | A | 5/1999 | Walther et al. |
| 6,033,804 | A | 3/2000 | Doyle et al. |
| 6,100,337 | A | 8/2000 | Spence et al. |
| 6,145,588 | A | 11/2000 | Martin et al. |
| 6,197,889 | B1 | 3/2001 | Knoll et al. |
| 6,211,292 | B1 | 4/2001 | St. Clair |
| 6,306,419 | B1 | 10/2001 | Vachon et al. |
| 6,391,981 | B1 | 5/2002 | Willis et al. |
| 6,413,298 | B1 | 7/2002 | Wnek et al. |
| 6,444,767 | B1 | 9/2002 | Schade et al. |
| 6,455,651 | B1 | 9/2002 | Willis et al. |
| 6,492,469 | B2 | 12/2002 | Willis et al. |
| 6,515,083 | B2 | 2/2003 | Ozawa et al. |
| 6,536,514 | B1 | 3/2003 | Sugiyama et al. |
| 6,579,948 | B1 | 6/2003 | Tan et al. |
| 6,664,309 | B2 | 12/2003 | Svenningsen et al. |
| 6,664,340 | B2 | 12/2003 | Kaerki et al. |
| 6,686,423 | B1 | 2/2004 | Desbois et al. |
| 6,699,941 | B1 | 3/2004 | Handlin et al. |
| 6,703,446 | B2 | 3/2004 | Schwindeman et al. |
| 6,716,777 | B2 | 4/2004 | Lin |
| 6,767,976 | B2 | 7/2004 | Hamada et al. |
| 6,777,082 | B2 | 8/2004 | Patel et al. |
| 6,838,391 | B2 | 1/2005 | Harle |
| 6,841,601 | B2 | 1/2005 | Serpico et al. |
| 7,029,559 | B2 | 4/2006 | Won et al. |
| 7,060,788 | B2 | 6/2006 | Hucks et al. |
| 7,152,670 | B2 | 12/2006 | Dobbs et al. |
| 7,160,551 | B2 | 1/2007 | McHugh et al. |
| 7,169,848 | B2 | 1/2007 | Bening et al. |
| 7,169,849 | B2 | 1/2007 | Ikuji et al. |
| 7,188,666 | B2 | 3/2007 | Lee et al. |
| 7,228,891 | B2 | 6/2007 | Shin et al. |
| 7,231,967 | B2 | 6/2007 | Haglid |
| 7,307,127 | B1 | 12/2007 | Napadensky et al. |
| 7,309,522 | B2 | 12/2007 | Webb et al. |
| 7,312,292 | B2 | 12/2007 | Ravikiran |
| 7,320,361 | B2 | 1/2008 | Arai et al. |
| 7,323,265 | B2 | 1/2008 | Fan et al. |
| 7,598,337 | B2 | 10/2009 | Hung et al. |
| 7,601,785 | B2 | 10/2009 | Chang et al. |
| 7,737,224 | B2 | 6/2010 | Willis et al. |
| 7,740,968 | B2 | 6/2010 | Yamashita et al. |
| 7,754,844 | B2 | 7/2010 | Sakaguchi et al. |
| 7,807,759 | B2 | 10/2010 | Shin et al. |
| 7,851,575 | B2 | 12/2010 | Ravikiran |
| 7,977,713 | B2 | 7/2011 | Sankin et al. |
| 8,012,539 | B2 | 9/2011 | Handlin et al. |
| 2001/0053475 | A1 | 12/2001 | Ying et al. |
| 2003/0049511 | A1 | 3/2003 | Ritts et al. |
| 2003/0106680 | A1 | 6/2003 | Serpico et al. |
| 2003/0129469 | A1 | 7/2003 | Sun et al. |
| 2003/0176582 | A1* | 9/2003 | Bening et al. ................. 525/242 |
| 2003/0198858 | A1 | 10/2003 | Sun et al. |
| 2003/0228681 | A1 | 12/2003 | Ritts et al. |
| 2004/0005490 | A1 | 1/2004 | Fan et al. |
| 2004/0029014 | A1 | 2/2004 | Hwang et al. |
| 2004/0063865 | A1 | 4/2004 | Mariani et al. |
| 2004/0101753 | A1 | 5/2004 | Hwang |
| 2004/0137813 | A1 | 7/2004 | Faucher |
| 2004/0142910 | A1 | 7/2004 | Vachon et al. |
| 2004/0234851 | A1 | 11/2004 | Kim et al. |
| 2005/0061381 | A1 | 3/2005 | Hosoi |
| 2005/0133204 | A1 | 6/2005 | Gates et al. |
| 2005/0266290 | A1 | 12/2005 | Sun et al. |
| 2006/0147716 | A1 | 7/2006 | Braverman et al. |
| 2006/0147746 | A1 | 7/2006 | Wakako et al. |
| 2006/0154126 | A1 | 7/2006 | Ritts et al. |
| 2007/0021569 | A1* | 1/2007 | Willis .................... B01D 71/80 525/314 |
| 2008/0039584 | A1 | 2/2008 | Bening et al. |

(56) References Cited

U.S. PATENT DOCUMENTS

| | | |
|---|---|---|
| 2008/0085437 A1 | 4/2008 | Dean et al. |
| 2008/0124563 A1 | 5/2008 | Shima |
| 2008/0305251 A1 | 12/2008 | Fukuta et al. |
| 2009/0123804 A1 | 5/2009 | Yamashita et al. |
| 2009/0126370 A1 | 5/2009 | Tsai |
| 2009/0246593 A1 | 10/2009 | Nowatari et al. |
| 2009/0263699 A1 | 10/2009 | Sadasue et al. |
| 2009/0314480 A1 | 12/2009 | Grinbergs et al. |
| 2010/0031817 A1 | 2/2010 | Ehrenberg et al. |
| 2010/0048817 A1 | 2/2010 | Dado et al. |
| 2010/0087783 A1 | 4/2010 | Weber et al. |
| 2010/0159353 A1 | 6/2010 | Ohgi et al. |
| 2010/0167100 A1 | 7/2010 | Moore et al. |
| 2010/0167159 A1 | 7/2010 | Ono et al. |
| 2010/0170776 A1 | 7/2010 | Ehrenberg et al. |
| 2010/0203783 A1 | 8/2010 | Willis et al. |
| 2010/0204403 A1 | 8/2010 | Willis et al. |
| 2010/0233569 A1 | 9/2010 | Ono et al. |
| 2010/0261799 A1 | 10/2010 | Vachon et al. |
| 2010/0264369 A1 | 10/2010 | Zhang |
| 2010/0273901 A1 | 10/2010 | Ehrenberg et al. |
| 2011/0086982 A1* | 4/2011 | Willis ............................ 525/189 |
| 2011/0230614 A1 | 9/2011 | Handlin et al. |
| 2011/0268901 A1 | 11/2011 | Handlin et al. |
| 2012/0073791 A1* | 3/2012 | Dubois .......................... 165/138 |

FOREIGN PATENT DOCUMENTS

| | | |
|---|---|---|
| CA | 2616250 A1 | 1/2007 |
| CN | 101228192 A | 7/2008 |
| CN | 101421350 A | 4/2009 |
| DE | 3930217 A1 | 3/1991 |
| DE | 19728686 C1 | 4/1999 |
| EP | 215501 | 3/1987 |
| FR | 2662604 A2 | 12/1991 |
| GB | 419604 A | 11/1934 |
| GB | 949126 A | 2/1956 |
| GB | 1019847 A | 10/1963 |
| GB | 1144167 A | 3/1969 |
| GB | 1336764 A | 11/1973 |
| GB | 1380411 A | 1/1975 |
| GB | 2066267 A | 7/1981 |
| GB | 2107325 A | 4/1983 |
| GB | 2168648 A | 6/1986 |
| GB | 2272220 A | 5/1994 |
| GB | 2399787 A | 9/2004 |
| GB | 2434762 A | 8/2007 |
| GB | 2444242 A | 6/2008 |
| JP | 53136082 A | 11/1978 |
| JP | 1256583 A | 10/1989 |
| JP | 1559652 C | 5/1990 |
| JP | 4053885 A | 2/1992 |
| JP | 5303918 A | 11/1993 |
| JP | 6000923 A | 1/1994 |
| JP | 7018237 A | 1/1995 |
| JP | 1910228 C | 3/1995 |
| JP | 1914163 C | 3/1995 |
| JP | 7060907 A | 3/1995 |
| JP | 7082428 A | 3/1995 |
| JP | 1926012 C | 4/1995 |
| JP | 2549576 B2 | 10/1996 |
| JP | 9074273 A | 3/1997 |
| JP | 9078431 A | 3/1997 |
| JP | 9094925 A | 4/1997 |
| JP | 9156009 A | 6/1997 |
| JP | 9217046 A | 8/1997 |
| JP | 9235524 A | 9/1997 |
| JP | 9277478 A | 10/1997 |
| JP | 10061057 A | 3/1998 |
| JP | 10110150 A | 4/1998 |
| JP | 10158454 A | 6/1998 |
| JP | 10298514 A | 11/1998 |
| JP | 2837435 B2 | 12/1998 |
| JP | 2843947 B2 | 1/1999 |
| JP | 2868391 B2 | 3/1999 |
| JP | 3704906 B2 | 3/1999 |
| JP | 11080681 A | 3/1999 |
| JP | 11158299 A | 6/1999 |
| JP | 11199839 A | 7/1999 |
| JP | 2000033671 A | 2/2000 |
| JP | 2000034388 A | 2/2000 |
| JP | 2000038550 A | 2/2000 |
| JP | 2000136367 A | 5/2000 |
| JP | 2000318102 A | 11/2000 |
| JP | 2000345120 A | 12/2000 |
| JP | 2001020169 A | 1/2001 |
| JP | 2001062968 A | 3/2001 |
| JP | 3164554 B2 | 5/2001 |
| JP | 3249005 B2 | 1/2002 |
| JP | 2002338918 A | 1/2002 |
| JP | 2004050612 A | 2/2002 |
| JP | 2002105424 A | 4/2002 |
| JP | 3326195 B2 | 9/2002 |
| JP | 3338179 B2 | 10/2002 |
| JP | 3358391 B2 | 12/2002 |
| JP | 3370198 B2 | 1/2003 |
| JP | 3411068 B2 | 5/2003 |
| JP | 3484840 B2 | 1/2004 |
| JP | 3515740 B2 | 4/2004 |
| JP | 2004121828 A | 4/2004 |
| JP | 2004136480 A | 5/2004 |
| JP | 3660771 B2 | 6/2005 |
| JP | 2006021959 A | 1/2006 |
| JP | 3787935 B2 | 6/2006 |
| JP | 2007001086 A | 1/2007 |
| JP | 3887341 B2 | 2/2007 |
| JP | 2007105134 A | 4/2007 |
| JP | 2007126512 A | 5/2007 |
| JP | 3940952 B2 | 7/2007 |
| JP | 3967842 B2 | 8/2007 |
| JP | 2007238746 A | 9/2007 |
| JP | 2008073888 B2 | 4/2008 |
| JP | 2008127447 A | 6/2008 |
| JP | 2009143998 A | 7/2009 |
| JP | 4327040 B2 | 9/2009 |
| JP | 4414016 B2 | 2/2010 |
| JP | 2010085585 A | 4/2010 |
| JP | 2010106090 A | 5/2010 |
| JP | 4544563 B2 | 9/2010 |
| KR | 20020076825 A | 10/2002 |
| KR | 20040013555 A | 2/2004 |
| WO | 9821773 A1 | 5/1998 |
| WO | 0109239 A1 | 2/2001 |
| WO | 0272242 A1 | 1/2002 |
| WO | 03050896 A3 | 10/2002 |
| WO | 03050897 A3 | 10/2003 |
| WO | 2004004688 A1 | 1/2004 |
| WO | 2004032306 A3 | 7/2004 |
| WO | 2004070312 A1 | 8/2004 |
| WO | 2004051172 A1 | 3/2005 |
| WO | 2007010039 A1 | 1/2007 |
| WO | 2007010042 A1 | 1/2007 |
| WO | 2008030939 A3 | 7/2008 |
| WO | 2008089332 | 7/2008 |
| WO | 2011065460 A1 | 6/2011 |

OTHER PUBLICATIONS

Coates, Geoffrey W, Hustad, Phillip D., Reinartz, Stefan; Catalysts for the Living Insertion Polymerization of Alkenes: Access to New Polyolefin Architectures Using Ziegler-Natla Chemistry; Agnew. Chem. Int. Ed. 2002, 41, pp. 2236-2257.

Zhang, Hao and Nomura, Kotohiro, Living Copoolymerization of Ethylene with Styrene Catalyzed by (Cyclopentadienyl)(ketimide)titanium(IV) Complex-MAO Catalyst System, J. Am. Chem. Soc. 2005, 127, pp. 9364-9365.

Hawker, Craig J., Bosman, Anton W. Harth, Eva, New Polymer Synthesis by Nitroxide Mediated Living Radical Polymerization, Chem. Rev. 2001, 101, pp. 3661-3688.

Traubel, Dr. Harro, "New Materials Permeable to Water Vapour", Springer-Verlag (Berlin), Aug. 1999, ISBN 9783540649465.

People's Republic of China Search Report, dated May 20, 2014.

(56) References Cited

OTHER PUBLICATIONS

English abstract from Espacenet as well as full translation for JP200034388; published on Feb. 2, 2000 and retrieved on Sep. 16, 2014.

Office Action mailed Apr. 1, 2014; in corresponding Japanese patent application No. 2013-531639.

English translation of the Office Action mailed Apr. 1, 2014; in corresponding Japanese patent application No. 2013-531639.

* cited by examiner

ELASTIC, MOISTURE-VAPOR PERMEABLE FILMS, THEIR PREPARATION AND THEIR USE

FIELD OF THE DISCLOSURE

The present disclosure relates to films such as membranes and coatings and to coated articles. The films comprise a combination of at least one elastomeric styrenic block copolymer which is optionally functionalized with functional groups different from sulfonic acid or sulfonate ester functional groups, and at least one sulfonated block copolymer. Films comprising the optionally functionalized block copolymer(s) and the additional sulfonated block copolymer(s) are elastic and are moisture-vapor permeable, and thus useful, for example, as coatings in breathable clothing and footwear, industrial workwear including cleanroom coveralls, in medical applications such as wound dressings and protective clothing, for bed sheets and mattress or seat covers, and other non-apparel applications.

BACKGROUND OF THE DISCLOSURE

In recent years, many fabrics have been developed which the various manufacturers claim are moisture-vapor permeable. These materials are commonly described as breathable fabrics, and they normally incorporate a continuous polymer film. The film may be in the form of a thin coated layer applied directly to a fabric, or as a pre-cast film subsequently bonded to the fabric thermally or with an adhesive layer. The direct coatings may comprise one complete layer or more usually a series of different layers, for example, a base coat or tie coat directly attached to the fabric, one or more intermediate coats, and an outermost or top coat. The direct coating may therefore have the same polymer composition throughout, but more usually comprises a series of different polymer compositions applied by successive coating operations, in particular, the base coat and top coat usually have a substantially different polymer composition.

The complete coatings, separate coated layers, pre-cast films and adhesives may be formed from microporous polymers or hydrophilic polymers, or various combinations thereof may be used in the manufacture of breathable materials. A useful reference book for this technology including descriptions of manufacturing techniques and machinery is "New Materials Permeable to Water Vapour", Dr. Harro Träubel, Springer-Verlag (Berlin), 1999.

The major use of breathable materials is in the high-performance apparel area, although these materials are also used in footwear and industrial clothing as well as some other non-apparel applications such as military and first responders. The moisture-vapor permeability of the polymer membrane is sufficient to allow sensible and insensible perspiration to diffuse away from the body.

Styrenic block copolymers are well known in the art. Generally, styrenic block copolymers ("SBC") can comprise internal polymer blocks and terminal end polymer blocks comprising chemically different monomer types thereby providing particular desirable properties. As an example, in a more common form, SBC's may have internal blocks of conjugated diene and external blocks having aromatic alkenyl arenes. The interaction of the differing properties of the polymer blocks allow for different polymer characteristics to be obtained. For example, the elastomer properties of internal conjugated diene blocks along with the "harder" aromatic alkenyl arenes external blocks together form polymers which are useful for an enormous variety of applications. Such SBC's can be prepared through sequential polymerization and/or through coupling reactions.

It is known also that SBC can be functionalized in order to further modify their characteristics. For example, SBC can be modified by introducing functional groups such as carboxylic acids, esters or amides, phosphonate groups or sulfonate groups to the backbone of the polymer. Methods for incorporating functional groups into polymers containing unsaturation are taught, for example, in U.S. Pat. Nos. 3,135,716, 3,150,209, and 4,409,357. Alternative procedures in which functional groups are incorporated into hydrogenated SBC are taught, for example, in U.S. Pat. Nos. 4,578,429, and 4,970,265.

One of the first SBC functionalized by addition of sulfonic acid or sulfonate ester functional groups to the polymer backbone is disclosed, for example, in U.S. Pat. No. 3,577,357 to Winkler. The resulting block copolymer was characterized as having the general configuration A-B-(B-A)$_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The sulfonated block copolymers were described as having water absorption characteristics that might be useful in water purification membranes and the like, but were later found not to be castable into films (U.S. Pat. No. 5,468,574).

More recently, U.S. Pat. No. 7,737,224 to Willis et al., disclosed the preparation of sulfonated polymer and illustrated a sulfonated block copolymer that is solid in water comprising at least two polymer end blocks and at least one saturated polymer interior block wherein each end block is a polymer block resistant to sulfonation and at least one interior block is a saturated polymer block susceptible to sulfonation, and wherein at least one interior blocks is sulfonated to the extent of 10 to 100 mol percent of the sulfonation susceptible monomer in the block. The sulfonated block copolymers are described as being able to transport high amounts of moisture-vapor while at the same time having good dimensional stability and strength in the presence of water, and as being valuable materials for end use applications which call for a combination of good wet strength, good water and proton transport characteristics, good methanol resistance, easy film or membrane formation, barrier properties, control of flexibility and elasticity, adjustable hardness, and thermal/oxidative stability.

Additionally, WO 2008/089332 to Dado et al., discloses a process for preparing sulfonated block copolymers illustrating, e.g., the sulfonation of a precursor block polymer having at least one end block A and at least one interior block B wherein each A block is a polymer block resistant to sulfonation and each B block is a polymer block susceptible to sulfonation wherein said A and B blocks are substantially free of olefinic unsaturation. The precursor block polymer was reacted with an acyl sulfate in a reaction mixture further comprising at least one non-halogenated aliphatic solvent. According to Dado et al., the process results in a reaction product which comprised micelles of sulfonated polymer and/or other polymer aggregates of definable size and distribution.

SUMMARY OF THE DISCLOSURE

In a first aspect, the present disclosure generally provides for a film comprising polymer components (a) and (b) wherein
a) is at least one elastomeric styrenic block copolymer which is optionally functionalized with functional groups different from sulfonic acid or sulfonate ester functional groups,
b) is at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and
wherein (a) and (b) are present in weight a ratio of from about 0.1:1 to about 10:1.

In a second aspect, the present disclosure provides for films in accordance with the foregoing aspect, in which the ratio of (a) to (b) is from about 0.5:1 to about 5:1.

In a third aspect, the present disclosure provides for films in accordance with any one of the foregoing two aspects, wherein component (a) is or comprises at least one styrenic block copolymer having a general configuration A-B, A-B-A, $(A-B)_n(A-B-A)_n$, $(A-B-A)_nX$, $(A-B)_nX$, wherein n is an integer from about 2 to about 30, and X is the residue of a coupling agent,
each A block independently is a polymer block of one or more alkenyl arenes having a number average molecular weight of from 3,000 to 60,000; and
each B block independently is a polymer block of one or more conjugated dienes and from 0 to about 75%-wt. of one or more alkenyl arenes, which block contains no significant levels of olefinic unsaturation and has a number average molecular weight of from 10,000 to 300,000;
wherein the total amount of alkenyl arenes in the styrenic block copolymer is from about 2 to about 75%-wt.

In a fourth aspect, the present disclosure provides for films in accordance with any one of the foregoing three aspects, in which component (a) is or comprises at least one styrenic block copolymer having a total amount of alkenyl arenes from about 5 to about 65%-wt.

In a fifth aspect, the present disclosure provides for films in accordance with any one of the foregoing four aspects, in which component (a) is or comprises at least one S-E/B—S or S-E/P—S block copolymer which is optionally functionalized.

In a sixth aspect, the present disclosure provides for films in accordance with any one of the foregoing five aspects, in which the styrenic block copolymer component (a) consists of one or more non-functionalized styrenic block copolymers.

In a seventh aspect, the present disclosure provides for films in accordance with any one of the foregoing aspects one to five, in which the styrenic block copolymer component (a) consists of one or more functionalized styrenic block copolymers.

In an eighth aspect, the present disclosure provides for films in accordance with any one of the foregoing aspects one to five, in which the styrenic block copolymer component (a) consists of one or more functionalized styrenic block copolymers and one or more non-functionalized styrenic block copolymers.

In a ninth aspect, the present disclosure provides for films in accordance with any one of the foregoing eight aspects, in which component (b) is or comprises at least one sulfonated block copolymer having a general configuration A-B-A, A-B-A-B-A, $(A-B-A)_nX$, $(A-B)_nX$, A-D-B-D-A, A-B-D-B-A, $(A-D-B)_nX$, $(A-B-D)_nX$, where n is an integer from 2 to about 30, and X is a coupling agent residue and wherein each D block is a polymer block resistant to sulfonation and the plurality of A blocks, B blocks, or D blocks are the same or different.

In a tenth aspect, the present disclosure provides for films in accordance with any one of the foregoing nine aspects, in which component (b) is or comprises at least one sulfonated block copolymer having a general configuration A-B-A, A-B-A-B-A, $(A-B-A)_nX$, $(A-B)_nX$, A-D-B-D-A, A-B-D-B-A, $(A-D-B)_nX$, $(A-B-D)_nX$, where n is an integer from 2 to about 30, and X is a coupling agent residue and wherein each D block is a polymer block resistant to sulfonation and the plurality of A blocks, B blocks, or D blocks are the same or different, and wherein each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

In an eleventh aspect, the present disclosure provides for films in accordance with any one of the foregoing ten aspects, in which the film has no more than 50% set at 50% elongation.

In a twelfth aspect, the present disclosure provides for films in accordance with any one of the foregoing eleven aspects, in which the film has a moisture vapor transmission rate of at least 1,000 $g/m^2$/day as measured by the procedure described herein below.

In a thirteenth aspect, the present disclosure provides for coated articles comprising a substrate and a coating in which the coating is a film in accordance with any one of the foregoing twelve aspects.

In a fourteenth aspect, the present disclosure provides for coated articles in accordance with the foregoing thirteenth aspect, in which the substrate is a natural or synthetic, woven or non-woven material, or a mixture thereof.

In a fifteenth aspect, the present disclosure provides for coated articles in accordance with the foregoing thirteenth or fourteenth aspect, in which the substrate is flexible or elastic.

In a sixteenth aspect, the present disclosure provides for elastic membranes comprising polymer components (a) and (b) wherein
a) is at least one styrenic block copolymer which is optionally functionalized with functional groups different from sulfonic acid or sulfonate ester functional groups,
b) is at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and
wherein components (a) and (b) are present in weight a ratio of from about 0.1:1 to about 10:1, which membranes have no more than 50% set at 50% elongation, and have a moisture vapor transmission rate of at least 1,000 $g/m^2$/day as measured by the procedure described herein below.

In particular aspects, the disclosure provides for elastic membranes which comprise polymer components (a) and (b) of a film in accordance with any one of the foregoing aspects two to ten.

In a seventeenth aspect, the disclosure provides for coating and film-casting compositions comprising a liquid phase and polymer components (a) and (b) wherein
a) is at least one styrenic block copolymer which is optionally functionalized with functional groups different from sulfonic acid or sulfonate ester functional groups,
b) is at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block,
and components (a) and (b) are present in weight a ratio of from about 0.1:1 to about 10:1.

In particular aspects, the disclosure provides for coating and film-casting compositions which comprise polymer components (a) and (b) of a film in accordance with any one of the foregoing aspects two to ten.

In an eighteenth aspect, the disclosure provides for coating and film-casting compositions in accordance with the preceding two aspects in which the liquid phase comprises one or more organic solvents.

In a nineteenth aspect, the disclosure provides for coating and film-casting compositions in accordance with the preceding three aspects in which the liquid phase comprises one or more aprotic organic solvents.

In a twentieth aspect, the disclosure provides for coating and film-casting compositions in accordance with the preceding four aspects which have a solids content of no more than 50%-wt.

In a twenty-first aspect, the disclosure provides for coating and film-casting compositions in accordance with the preceding five aspects which are in form of aqueous or non-aqueous dispersions.

In a twenty-second aspect, the disclosure provides for coating and film-casting compositions in accordance with the preceding six aspects which is are form of non-aqueous dispersions or solutions.

DETAILED DESCRIPTION OF THE DISCLOSURE

Figure 1:
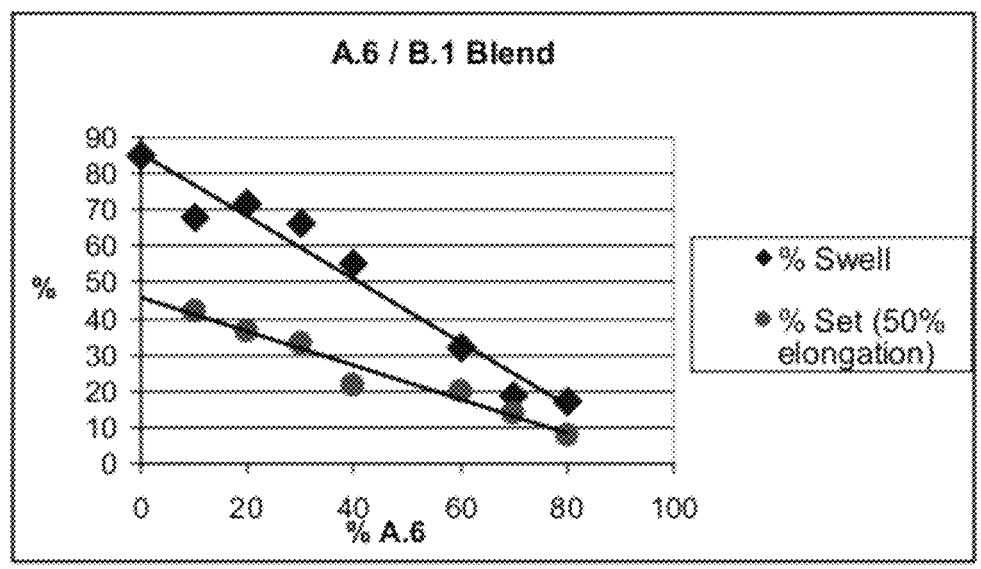
FIG. 1 illustrates the dependence of swell and set (at 50% elongation) of a film in accordance with the disclosure on the amount of component (a).
Figure 2:
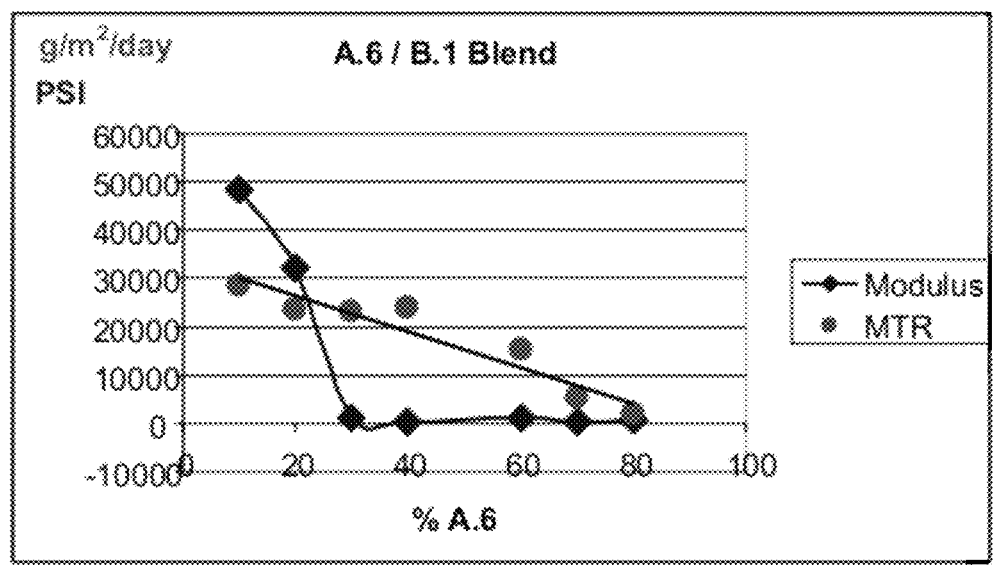
FIG. 2 illustrates the dependence of modulus and moisture transport rate (MTR) of a film in accordance with the disclosure on the amount of component (a).

A detailed description of embodiments is disclosed herein; however, it is to be understood that the described embodiments are merely exemplary of the disclosure and that the disclosure may be embodied in various and alternative forms of the described embodiments. Therefore, specific structural and functional details which are addressed in describing the embodiments herein are not to be interpreted as limiting, but merely as a basis for the claims and as a representative basis for teaching one skilled in the art to variously employ the present disclosure.

All publications, patent applications, and patents mentioned herein are incorporated by reference in their entirety. In the event of conflict, the present specification, including definitions, is intended to control.

Unless specifically stated otherwise, all technical terms used herein have the meaning as commonly understood by those skilled in the art.

Moreover, unless specifically stated otherwise, the following expressions as used herein are understood to have the following meanings Unless specifically stated otherwise, the expression "film" as used herein refers to a continuous sheet which may or may not be in contact with a substrate. The expression in particular encompasses membranes and coatings.

Unless specifically stated otherwise, the expression "coating" as used herein refers to a single-, bi- or multilayer direct coating or laminate which is applied to a surface of a substrate.

Unless specifically stated otherwise, the expression "%-wt." as used herein refers to the number of parts by weight of monomer per 100 parts by weight of polymer on a dry weight basis, or the number of parts by weight of ingredient per 100 parts by weight of specified composition.

Unless specifically stated otherwise, the expression "molecular weight" as used herein and relating to a polymer refers to the number average molecular weight.

Unless specifically stated otherwise, the expression "solution" as used herein refers to a liquid, uniformly dispersed mixture at the molecular or ionic level of one or more substances (the solute) in one or more liquid substances (the solvent).

Unless specifically stated otherwise, the expression "dispersion" as used herein refers to a system having a continuous, liquid phase and at least one discontinuous phase. The discontinuous phase may be made up by solid, finely divides particles and/or by liquid droplets, including colloidal particles and micelles. The expression "dispersion" as used herein in particular includes systems in which at least one discontinuous phase is in form of micelles. Also, where the discontinuous phase(s) is(are) exclusively made up by liquid droplets, the expression "dispersion" in particular encompasses "emulsion." A person of ordinary skill will readily appreciate that there are no sharp differences between dispersions, colloidal or micellar solutions and solutions on a molecular level. Thus, a dispersion of micelles may also herein be referred to as a solution of micelles.

Unless specifically stated otherwise, the expressions "elastic" and "elasticity" as used herein and relating to the film refer to its capability to recover its original shape partially or completely once a deforming force or pressure has been removed. The expressions in particular encompass "stretchable" and "stretchability," i.e., the capability of the film to recover its original dimension partially or completely once a stretching force has been removed.

Further, all ranges disclosed herein are intended to include any combination of the mentioned upper and lower limits even if the particular combination and range is not specifically listed. Correspondingly, all upper and lower limit values mentioned herein are intended to allow for any combination thereof even if the particular combination and range is not expressly specified.

According to several embodiments of the present disclosure it has surprisingly been found that films based on the optionally functionalized SBC and the sulfonated block copolymer exhibit elasticity as well as moisture-vapor permeability. It has also surprisingly been found according to several embodiments of the present disclosure that improved stretchable, light-weight coatings can be obtained using the coating composition. Additionally, films according to several embodiments of the present disclosure surprisingly have been found to be resistant to rub-off. According to several particular embodiments of the present disclosure it has furthermore surprisingly been found that it is possible to obtain coatings which can be stretched repeatedly without detrimental effects on the water-permeability.

The films disclosed herein are broadly suited for a wide variety of applications in praxis, and are especially suited for applications which call for moisture-vapor transport qualities at low weight, high durability and elasticity.

In some embodiments, the optionally functionalized SBC which may be employed according to embodiments of the present disclosure include the SBC compositions as described in U.S. RE 27,145, U.S. Pat. Nos. 3,634,549, 3,670,054, 3,700,633, 4,578,429, 4,603,155, 4,946,899, 4,970,265, 6,211,292, and 6,515,083, the respective disclosure of each of which is herein incorporated by reference.

In some embodiments, the sulfonated block polymers which may be employed according to embodiments of the present disclosure include the sulfonated block copolymers as described in U.S. Pat. No. 7,737,224 to Willis et al., the entire disclosure of which is incorporated herein by reference. The sulfonated block polymers, including the sulfonated block copolymers as described in U.S. Pat. No. 7,737,224, may be prepared according to the process of WO 2008/089332 to Dado et al., the entire disclosure of which is hereby incorporated by reference.

A. Optionally Functionalized SBC

Styrenic block copolymers may be made by a number of different processes, including anionic polymerization, moderated anionic polymerization, cationic polymerization, Ziegler-Natta polymerization, and living chain or stable free radical polymerization. Anionic polymerization is described below in more detail, and in the referenced documents. Moderated anionic polymerization processes for making styrenic block copolymers are disclosed, for example, in U.S. Pat. Nos. 6,391,981, 6,455,651 and 6,492,469, each of which is incorporated herein by reference. Cationic polymerization processes for preparing block copolymers are disclosed, for example, in U.S. Pat. Nos. 6,515,083 and 4,946,899, each of which is incorporated herein by reference.

Living Ziegler-Natta polymerization processes that can be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc., Comm., 2005) describe living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers can be synthesized by living or stable free radical techniques. Nitroxide mediated polymerization methods are preferred living chain or stable free radical polymerization processes when preparing the precursor polymers.

A.1 Polymer Structure of Optionally Functionalized SBC

In some embodiments, the coating dispersions of the present disclosure comprise at least one hydrogenated styrenic block copolymer. Suitable hydrogenated styrenic block copolymers include, for example, the hydrogenated block copolymers described in U.S. Pat. No. 3,595,942, U.S. Re. 27,145, U.S. Pat. Nos. 3,700,633, 4,089,913, 4,122,134, 4,267,284, 4,603,155, 5,191,024, 5,306,779, 5,346,964, 6,197,889, and 7,169,848, all of which are herein incorporated by reference.

In some embodiments, the hydrogenated block copolymers have a general configuration A-B, A-B-A, $(A-B)_n$, $(A-B-A)_n$, $(A-B-A)_nX$, $(A-B)_nX$ or a mixture thereof, wherein n is an integer from about 2 to about 30, X is the residue of a coupling agent, each A block independently is a polymer block of one or more alkenyl arenes having a number average molecular weight of from 3,000 to 60,000; and each B block independently is a polymer block of one or more conjugated dienes and from 0 to about 75%-wt. of one or more alkenyl arenes, which block contains no significant levels of olefinic unsaturation and has a number average molecular weight of from 30,000 to 300,000;

wherein the total amount of alkenyl arenes in the hydrogenated block copolymer is from about 2 to about 75%-wt, or from about 5 to about 65%-wt.

In accordance with some embodiments of suitable hydrogenated block copolymers, the vinyl aromatic hydrocarbon useful as the monomer precursor of the A blocks has a vinyl group, i.e., a —CH=CH$_2$ group, attached directly to an aromatic ring and has a total of up to 12 carbon atoms. Preferred vinyl aromatic hydrocarbons are styrene and styrene homologs such as those of the formula

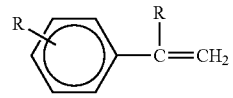

wherein each R independently is hydrogen or a $C_1$-$C_4$-alkyl group. Illustrative of such compounds are styrene, alpha-methylstyrene, alpha-ethylstyrene, p-methylstyrene, p-ethylstyrene, m-propylstyrene and alpha,4-dimethylstyrene. Styrene and alpha-methylstyrene constitute a preferred class of vinyl aromatic hydrocarbons and particularly preferred is styrene.

In some embodiments, the A blocks of the block copolymer independently are at least predominantly the polymerized vinyl aromatic hydrocarbon and preferably are homopolymeric blocks. In other embodiments, one or more A blocks are blocks wherein some of the monomer of the B block is copolymerized with the predominant vinyl aromatic hydrocarbon monomer of block A. Such blocks are termed tapered and have at least about 85% by mol and preferably at least 93% by mol of the polymerized vinyl aromatic hydrocarbon with any remainder being the conjugated alkadiene of block B. In further embodiments, the A block contains a mixture of vinyl aromatic.

The average molecular weight of an A block is typically from about 3,000 to about 60,000, or from about 4,000 to about 55,000, or from about 5,000 to about 50,000.

In accordance with some embodiments of suitable hydrogenated block copolymers, each B block independently is at least predominantly polymerized conjugated alkadiene. The alkadienes useful as the monomer for a B block are conjugated alkadienes of up to 8 carbon atoms inclusive such as those conjugated dienes of the formula

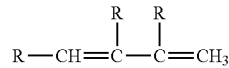

wherein each R independently is hydrogen or a $C_1$-$C_4$—alkyl group. Illustrative of such alkadienes are butadiene, isoprene, 2,3-dimethylbutadiene, 1,3-octadiene, 1,3-pentadiene and 2-methyl-1,3-hexadiene. Preferred conjugated alkadienes are butadiene and isoprene and butadiene is particularly preferred. Each B block is at least predominantly polymerized alkadiene with the B block being at least about 85% mol and preferably at least about 93% mol of polymerized alkadiene with any remainder being the vinyl aromatic hydrocarbon of the A blocks in the case of a tapered block. In some embodiments, one or more or all B blocks present in the hydrogenated block copolymer are a homopolymeric blocks of an alkadiene. In other embodiments, one or more or all B blocks present in the hydrogenated block copolymer are blocks of mixed polymerized alkadienes. Where a B block is or comprises a copolymerized section, the copolymerized section may have a random copolymer structure or a tapered copolymer structure.

Moreover, within a polymerized alkadiene block two modes of polymerization are possible and are generally observed. In what is termed a 1,4 polymerization, each carbon atom of the four-carbon alkadiene moiety is incorporated within the polymer chain which then includes two carbon atoms joined by an ethylenic linkage. In what is termed 1,2 polymerization, the polymerization involves only one carbon-carbon double bond of the conjugated alkadiene. The carbon atoms of that bond will be incorporated into the polymer chain which will then contain a pendant unsaturated group. Control of the two modes of polymerization is within the skill of the art. In some particular embodiments, the hydrogenated block copolymers comprise one or more B blocks wherein from about 25% to about 60 mole-%, or from about 35 to 55 mole-%, or from about 40 to about 50 mole-%, of the units are the result of 1,2-polymerization. The average molecular weight of a B block is suitably from about 30,000 to about 300,000, or from about 30,000 to about 150,000, or from about 40,000 to about 130,000.

In accordance with some embodiments of suitable hydrogenated block copolymers, the A blocks contribute a total of from about 2%-wt. to about 65%-wt., or from about 5%-wt. to about 55%-wt., or from about 7%-wt. to about 50%-wt., based on the total block copolymer.

In accordance with some embodiments, suitable hydrogenated block copolymers generally have an average molecular weight of from abut 25,000 to about 350,000, or from about 35,000 to about 300,000. These average molecular weights are determined by conventional techniques such as tritium counting methods or osmotic pressure measurements.

The structure of the suitable hydrogenated block copolymer may vary and will depend upon the method of polymerization employed to produce the block copolymer. In one aspect, the block copolymer is termed linear and is produced by sequential polymerization of the blocks. By way of example in producing a three-block or triblock polymer, the vinyl aromatic hydrocarbon of the A block is polymerized through the use of an initiator, preferably an alkyl lithium compound. The conjugated alkadiene of block B is then introduced and subsequently the vinyl hydrocarbon required for the second A block. Such a block copolymer is characterized as ABA. A two-block or diblock polymer may be produced by polymerizing an A block using a lithium initiator and subsequently introducing the conjugated alkadiene of the second block. Such a polymer would be characterized as AB. Substantially complete polymerization of the monomer of each block prior to introducing the monomer of the next block will result in the formation of homopolymeric blocks. If, prior to the complete polymerization of any one block, the monomer of the next block is introduced a tapered block will result. Similar sequential polymerization techniques are employed to produce block copolymers characterized as ABABA, ABAB, ABABABA, or even polymers of a higher number of blocks. Production of block copolymers, particularly those of a relatively high number of blocks, may also be accomplished through the use of a coupling agent to couple or connect growing polymer chains. Use of a difunctional coupling agent such as dihaloalkane will result in the production of linear polymers but use of a coupling agent having a functionality of three or more, e.g., silicon tetrahalide or dialkyl esters of dicarboxylic acids, will result in the formation of polymers which are termed radial or branched, respectively.

In particular embodiments, the block copolymers are linear polymers of the following types: polystyrene-polybutadiene (SB), polystyrene-polyisoprene (SI), polystyrene-polybutadiene-polystyrene (SBS), polystyrene-polyisoprene-polybutadiene (SIS), poly(alpha-methylstyrene-polybutadiene-poly(alpha-methylstyrene), poly(alpha-methylstyrene)-polyisoprene-poly(alpha-methylstyrene). Such block copolymers include, e.g., KRATON® D, G and RP Thermoplastic Rubbers. In further particular embodiments, the block copolymers are of S-E/B—S or S-E/P—S block copolymers. Such block copolymers include, e.g., KRATON® A and G Thermoplastic Rubbers.

The hydrogenation of the block copolymers is also well known in the art and includes catalytic hydrogenation in the presence of Raney nickel or elemental noble metal in finely divided form, e.g., finely divided platinum or palladium. Such hydrogenation typically results in the hydrogenation of most if not all of the unsaturation of the aromatic unsaturation in the A blocks as well as the ethylenic unsaturation of aliphatic B block. In the production of the components of the blends of the disclosure, a partial hydrogenation is employed which serves to hydrogenate most of the unsaturation of each aliphatic B block while not hydrogenating the unsaturation of the aromatic rings of A blocks to any substantial extent. The process of hydrogenation is illustrated by the disclosures of U.S. Pat. Nos. 3,113,986 and 4,226,952. Suitable partially hydrogenated block copolymers are those wherein no more than 25% and preferably no more than 5% of the aromatic unsaturation has been hydrogenated and in the hydrogenated polymerized conjugated alkadiene block the residual unsaturation is from about 0.5% to about 20% of the unsaturation after hydrogenation.

The partially hydrogenated block copolymer is often identified by the structure of the block copolymer precursor and the "apparent" structure of the aliphatic block(s). Thus, partial hydrogenation of an SBS block polymer will result in a polymer having a hydrogenated mid-block which is apparently polyethylene in the case of a mid-block produced by 1,4-polymerization and ethylene/butylene copolymer in the case of a mid-block unit produced with a portion of 1,2-polymerization and a portion of 1,4-polymerization. These are indicated by SES and S-E/B—S respectively. A corresponding diblock polymer would be termed SE or SEB. The polymer produced by partial hydrogenation of a SIS block copolymer of a high degree of 1,4-structure in the mid-block is termed, upon hydrogenation, a S-E/P—S polymer because of the similarity of the mid-block to an ethylene/propylene copolymer. The partially hydrogenated block copolymers of these types are also well known in the art with a number being commercial. For example, certain of the partially hydrogenated block copolymers are marketed as KRATON® G Thermoplastic Rubber.

A.2 Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present disclosure include the initial monomers noted above. Other important starting materials for anionic copolymerizations include one or more polymerization initiators. In the present disclosure suitable initiators include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, the disclosure of which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and U.S. Re. 27,145, the disclosure of each of which is incorporated herein by reference.

Polymerization conditions to prepare the block copolymers of the present disclosure are typically similar to those used for anionic polymerizations in general. The polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably under nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are to lower the viscosity of the living polymer solution allowing for a process that operates at higher polymer concentrations and thus uses less solvent, to enhance the thermal stability of the living polymer chain end which permits polymerization at higher temperatures and again, reduces the viscosity of the polymer solution allowing for the use of less solvent, and to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. Nos. 6,391,981, 6,455,651 and 6,492,469, the disclosure of each of which is herein incorporated by reference. Related information is disclosed in U.S. Pat. Nos. 6,444,767 and 6,686,423, the disclosure of each of which is incorporated herein by reference. The polymer made by such a moderated, anionic polymerization process can have the same structure as one prepared using the conventional anionic polymerization process and as such, this process can be useful in making the polymers of the present disclosure. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents is known in the art and can be used in preparing the block copolymers. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. Nos. 3,985,830, 4,391,949 and 4,444,953; as well as CA 716,645, the disclosure of each of which is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and X is the remnant or residue of a coupling agent.

A.3 Process to Prepare Selectively, Partially or Completely Hydrogenated Block Copolymers As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is preferable to selectively, partially or completely hydrogenate non-aromatic double bonds of the block copolymer. Hydrogenation generally improves thermal stability, ultraviolet light stability, oxidative stability, and, therefore, weatherability of the final polymer, and reduces the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. Nos. 3,595,942, 3,634,549, 3,670,054, 3,700,633, and U.S. Re. 27,145, the disclosure of each of which is incorporated herein by reference. These methods operate to hydrogenate polymers containing ethylenic (non-aromatic) unsaturation and are based upon operation of a suitable catalyst. Such a catalyst, or catalyst precursor, preferably comprises a Group 8 to 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out selectively, i.e., under such conditions that at least about 90 percent of the non-aromatic double bonds are reduced, and between zero and 10 percent of the aromatic double bonds are reduced. Preferably, at least about 95 percent of the non-aromatic double bonds are reduced, and more preferably about 98 percent of the non-aromatic double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen and nitrogen. Care must be exercised in this step to avoid that an explosive mixture of oxygen and hydrocarbons is formed.

A.4 Process to Make Functionalized SBC

The particular process used to functionalize the selectively hydrogenated block copolymers is not critical. Acid and hydroxy functionalized SBC can be prepared advantageously as taught in U.S. Pat. No. 4,578,429 the respective disclosure of which is incorporated herein by reference. The patent describes the grafting of monomers to secondary and tertiary carbon atoms on the hydrogenated diene component of the block copolymers.

Acid and hydroxy functionalities can also be incorporated in SBC as described in U.S. Pat. No. 4,145,298. The selectively hydrogenated block polymers are carboxylated to introduce carboxylic acid functionality into the aromatic portion of the block polymer molecule. The carboxylic acid functionality is introduced by consecutive steps of metallation, carboxylation and acidification. The process of metallation comprises creating chemically active sites on the aromatic rings of the aromatic portion of the SBC by reacting the polymer and an active metal compound, particularly when the active metal of the active metal compound is an alkali metal. The metallation reaction typically takes place at a temperature from about 0° C. to about 100° C. in the liquid phase in the presence of an inert reaction diluent, for example, a saturated aliphatic hydrocarbon such as cyclohexane. This process of metallation is known in the art, being described more fully in U.S. Pat. No. 4,145,298, the respective disclosure of which is herein incorporated by reference.

The carboxylation process which is applied to the metallated, selectively hydrogenated block polymer is also well known in the art. The metallated polymer is contacted with gaseous carbon dioxide by passing the carbon dioxide through a solution of the metallated polymer in an inert reaction diluent which is preferably the diluent in which the metallated polymer is produced. This process is described more fully in U.S. Pat. No. 4,145,490, 3,976,628 and EP 215,501, the respective disclosure of each of which is herein incorporated by reference. The metallated polymer reacts with the carbon dioxide to produce a metal salt, typically an alkali metal salt, of the carboxyated selectively hydrogenated block polymer and thereby introduces carboxylate functionality into the polymer. This metal salt is acidified as by contact with dilute mineral acid such as hydrochloric acid or an organic acid, such as acetic acid, and the resulting carboxylic acid functionalized polymer is recovered by conventional methods such as selective extraction or filtration, following if necessary, precipitation with a non-solvent.

The hydroxy functionalized block copolymer useful in the present invention is preferably prepared by graft reacting an unsaturated hydroxy-containing compound, such as allyl alcohol, 2-hydroxyethylacrylate, 3-hydroxypropylacrylate, 4-hydroxybutylacrylate or the corresponding methacrylates, etc., e.g., with a selectively hydrogenated A-B-A block copolymer wherein the A component is predominately a polymerized vinyl aromatic hydrocarbon, and the B component prior to hydrogenation is predominately a polymerized conjugated diene. The A component is preferably polystyrene and is preferably hydrogenated to a final unsaturation above 50 percent of the original unsaturation. The B component is preferably poly(1,3-butadiene) or polyisoprene and should be hydrogenated to an unsaturation that is less than 10 percent of the original unsaturation, preferably less than 5% of the original unsaturation. Monomers which can be used include hydroxyl group containing compounds, preferably hydroxy $C_1$-$C_{20}$ alkyl acrylates or methacrylates such as 2-hydroxyethylacrylate. Of course, mixtures of monomers can be also added so as to achieve graft copolymers in which the graft chains contain at least two different monomers therein (in addition to the base polymer monomers).

In some embodiments, the acid functionalized block copolymers are prepared by reacting a monocarboxylic or polycarboxylic acid compound, such as maleic acid or a derivative such as maleic anhydride, with a selectively hydrogenated styrenic block copolymer. The preferred acid compounds are unsaturated monocarboxylic and polycarboxylic-containing acids ($C_3$-$C_{10}$) with preferably at least one olefinic unsaturation, and anhydrides, salts, esters, ethers and other substituted derivatives from such acids. Examples of such materials include maleic acid, fumaric acid, itaconic acid, citraconic acid, acrylic acid, acrylic polyethers, acrylic anhydride, methacrylic acid, crotonic acid, isocrotonic acid, mesaconic acid, angelic acid, maleic anhydride, itaconic anhydride and citraconic anhydride. The preferred monomers to be grafted to the block copolymers according to the present invention are maleic anhydride, maleic acid, fumaric acid and their derivatives.

The grafting reaction is initiated by a free radical initiator which is preferably an organic peroxygen compound. Special preferred peroxides are 2,5-dimethyl-2,5-di(t-butylperoxy) hexane (Lupersol 101), di-t-butylperoxide, 2,5-dimethyl-2,5-di-tert-butylperoxy-3-hexane (Lupersol 130) α,α'-bis(tert-butylperoxy)diisopropylbenzene (VulCup R), or any free radical initiator having a short half-life under the base polymer processing conditions. See pages 66-67 of Modern Plastics, November 1971, which is incorporated by reference herein, for a more complete list of such compounds.

The grafted polymer may contain from about 0.1 to about 10%-wt., or from about 0.2 to about 7%-wt., or from about 0.5 to about 5%-wt., of the grafted monomer.

The amine functionalized block copolymers can be made by first forming an acid modified block copolymer as described above and then reacting this polymer with ammonia. This reaction is carried out in the same type of extrusion equipment as is used in the grafting.

The carboxylic acid-functionalized block copolymer (styrene block) to which amine functionality is to be added is converted to an amine group-containing carboxamide-functionalized polymer by reaction with ammonia in liquid phase solution in a polar reaction diluent or a mixture of a polar reaction diluent and inert organic solvent, meaning a solvent that does not react with any of the substances participating in the reaction, followed by applying heat to convert the ammonium salt groups initially formed to carbamoyl groups. In a typical procedure the carboxylic acid-functionalized block polymer is dissolved in the polar reaction diluent and contacted with anhydrous ammonia. The ammonia is preferably provided as gaseous ammonia which is passed into the polymer solution at pressures up to about 150 psig, preferably up to about 100 psig. The ammonia is typically added at temperatures from about 10° C. to about 60° C. and is conveniently introduced into the polymer solution as by bubbling at the ambient temperature of the addition. The ammonium salt which initially results from this contacting is optionally isolated by known techniques such as solvent removal or precipitation. More conveniently, the ammonium salt is reacted in situ to the carbamoyl-functionalized polymer. This conversion is accomplished by heating the ammonium salt intermediate to an elevated temperature and pressure. The carbamoyl-functionalized polymer is then recovered from the product mixture by conventional methods such as selective extraction or precipitation with a non-solvent such as methanol or isopropanol.

The carbamoyl-functionalized polymers are the selectively hydrogenated block polymers having, as an average, a plurality of carbamoyl moieties, i.e., —$CONH_2$ groups, as substituents on aromatic ring carbon atoms of the aromatic portion of the polymer molecule. However, under the conditions of the reaction with ammonia a substantial proportion, generally more than about 60% and often more than about 80%, of the carboxylic acid groups will be converted to carbamoyl moieties so that the carbamoyl-funtionalzied polymer will contain an average of from about 5 to about 16 carboxamide groups per molecule, more often from about 8 to about 15 carboxamide moieties per molecule, randomly found throughout the aromatic portion of the molecule.

B. Sulfonated Block Copolymers

B.1 Polymer Structure of Sulfonated Block Copolymers

In one embodiment, the sulfonated block copolymer has at least two polymer end or outer blocks A and at least one polymer interior block B wherein each A block is a polymer block which is resistant to sulfonation and each B block is a polymer block which is susceptible to sulfonation.

Preferred block copolymer structures have a general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-B-D)_nX$ or mixtures thereof, where n is an integer from 2 to about 30, X is coupling agent residue and A, B and D are as defined hereinafter.

Most preferred structures are linear structures such as A-B-A, $(A-B)_2X$, A-B-D-B-A, $(A-B-D)_2X$, A-D-B-D-A, and $(A-D-B)_2X$ and radial structures such as $(A-B)_nX$ and $(A-D-B)_nX$ where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture can include a certain amount of A-B diblock copolymer, in addition to any linear and/or radial polymers. The respective amounts have not been found to be detrimental.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymer segments of ethylene, it may be useful to polymerize ethylene via a Ziegler-Natta process, as taught in the references in the review article by G. W. Coates et al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared via a Ziegler-Natta process, as taught in the references in the above-cited review article by G. W. Coates et al. Preferably, the alpha-olefins are propylene, butylene, hexane or octane, with propylene being most preferred. The block molecular weight for each of such alpha-olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosures is herein incorporated by reference.

The A blocks may also be polymer segments of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester. Examples of the anionic polymerizable monomer that can be optionally used include methacrylic or acrylic monomers such as trimethylsilyl methacrylate, N—,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide, N,N-di-isopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers such as those present in the B blocks which are addressed in more detail in the following. In some embodiments, the A blocks may contain up to 10 mol percent, preferably they will contain only up to 5 mol percent, and particularly preferably only up to 2 mol percent of the vinyl aromatic monomers as mentioned for the B blocks. However, in the most preferred embodiments, the A blocks will contain no vinyl monomers as present in the B blocks. The sulfonation level in the A blocks may be from 0 up to 15 mol percent of the total monomers in the A block. It will be understood by those skilled in the art that suitable ranges include any combination of the specified mol percents even if the specific combination and range is not listed herewith.

The B blocks, in each case, comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers mentioned above, the B blocks may also comprise a partially or completely hydrogenated copolymer of such monomer(s) with a conjugated diene selected from 1,3-butadiene, isoprene and mixtures thereof, having a vinyl content of between 20 and 80 mol percent. These copolymers with partially or completely hydrogenated dienes may be random copolymers, tapered copolymers, block copolymers or controlled distribution copolymers. In one preferred embodiment, the B blocks are selectively partially or completely hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference. U.S. Pat. No. 7,169,848 also discloses the preparation of sulfonated block copolymers. The B blocks comprising a styrene block are described herein. In a preferred embodiment, the B blocks are made up of unsubstituted styrene and will not require a separate hydrogenation step.

In another aspect of the present disclosure, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof the butadiene portion of the polymer block having a vinyl content prior to hydrogenation of between 20 and 80 mol percent and the polymer block having a number average molecular weight of between 1,000 and 50,000. In another embodiment, the impact modifier block D comprises an acrylate or silicone polymer having a number average molecular weight of 1,000 to 50,000. In still another embodiment, the impact modifier block D is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that suitable ranges include any combination of the specified mol percents even if the specific combination is not listed herewith.

In a preferred embodiment, the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are such that each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been re-dissolved in tetrahydrofuran with a standardized solution of NaOH in a mixed alcohol and water solvent.

B.2 Process to Make Sulfonated Block Copolymers

According to the multiple embodiments disclosed herein, the above prepared hydrogenated block copolymers are sulfonated to obtain a sulfonated polymer product that is in solution and in micellar form.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks which, in turn, are swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core, while the outer sulfonation resistant blocks form a shell which is solvated by a non-halogenated aliphatic solvent. In addition to forming discrete micelles, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

Micelles can be formed as a result of the sulfonation process, or alternatively, the block copolymer may arrange in a micelle structure prior to sulfonation.

In some embodiments, for the formation of micelles, the sulfonation processes as described in WO 2008/089332 may be employed. The methods are useful for preparing sulfonated styrenic block copolymers as described in U.S. Pat. No. 7,737,224.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates allow that the sulfonation of the polymer proceeds essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

b) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted depends upon the composition of the starting polymer, since the limiting concentration below which polymer gelling is non-disabling or negligible depends upon the polymer composition. As stated above, the limiting concentration may also be dependent on other factors such as the identity of the solvent or the solvent mixture used and the desired degree of sulfonation. Generally, the polymer concentration falls within the range of from about 1%-wt. to about 30%-wt., alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mol percents even if the specific combination and range is not listed herewith.

In accordance with some embodiments of the presently described technology, the initial concentration of the precursor block polymer or mixture of precursor block polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified weight percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymer(s) in the reaction mixture may be above the limiting concentration of the precursor polymer.

c) Sulfonation Agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

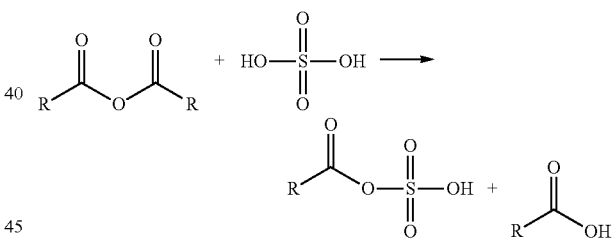

Acyl sulfates are subject to slow decomposition during the course of sulfonation reactions forming alpha-sulfonated carboxylic acids of the following formula:

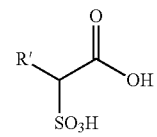

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. It will be understood by those skilled in the art that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

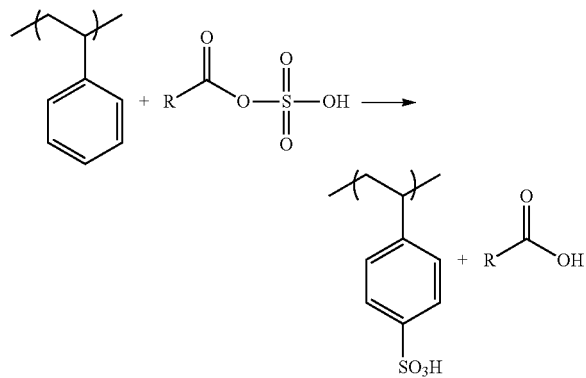

The acyl sulfate reagent that may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated polymer can be measured by NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkyl-carboxylic acid), and then to calculate the degree of styrene sulfonation based on mass balance. Alternatively, the level of sulfonation can be determined by titration of a dry polymer sample, which has been re-dissolved in tetrahydrofuran with a standardized solution of NaOH in a mixture of alcohol and water. In the latter case, rigorous removal of by-product acids is preferably ensured.

Although embodiments for sulfonating polymers are described above in the context of acyl sulfate reagents, the utility of other sulfonation reagents are also contemplated. For example, the use of those sulfonation reagents derived from complexing/reacting sulfur trioxides and phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphosphoric acid, 1,4-dioxane, triethylamine, etc.

d) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

As a result of sulfonation in a non-halogenated aliphatic solvent, for example, the micelle cores contain sulfonation susceptible blocks having sulfonic acid and/or sulfonate ester functionality which are surrounded by an outer shell containing sulfonation resistant blocks of the block copolymer. The driving force for this phase segregation (causing the micelle formation) in solution has been attributed to the considerable difference in polarity between the sulfonated block(s) and the non-sulfonated blocks of the sulfonated block copolymer. The latter blocks are freely solvable by a non-halogenated aliphatic solvent, for example the first solvent disclosed above. On the other hand, the sulfonated polymer block(s) may arrange to concentrate in the core of micelle. It will be understood by those skilled in the art that micelle formation depends upon various factors including the nature of the solvent or solvent system. Also, micelle formation has not been found to be necessary to the preparation of the films disclosed herein.

C. Coating and Film-Casting Compositions

The coating and film-casting compositions of the present disclosure are dispersions or solutions comprising a liquid phase and a) at least one styrenic block copolymer which is optionally functionalized with functional groups different from sulfonic acid or sulfonate ester functional groups, b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1.

In some embodiments, the compositions are prepared by providing a solution or dispersion of one of the components (a) and (b) and dispersing or dissolving appropriate amounts of the other of the components (a) and (b) in the solution or dispersion of the first component.

In other embodiments each of the components (a) and (b) is provided in a separate solution or dispersion and the separate solutions or dispersions of (a) and (b) are admixed in appropriate amounts.

In some embodiments, the dispersions or solutions of (a) and/or (b) are dispersions or solutions of the block copolymers in one or more liquids (liquid phase) suitable as dispersant or solvent. Suitable liquids are any liquids which are inert to the components (a) and (b) of the composition under the conditions for forming and using the composition and, thus, may be protic or aprotic and may be polar or apolar. The nature and composition of the liquid phase is generally not critical so long as the liquid phase is capable to dissolve or disperse the components (a) and (b) to a degree which is sufficient to achieve a coating or film-casting composition of adequate homogeneity. Those of skill in the art will appreciate that the liquid phase may be made up of dispersants and/or solvents having similar or different polarity and/or proticity.

In some embodiments, the liquid phase comprises one or more aprotic organic solvents. Suitable aprotic organic solvents include, e.g., optionally halogenated hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In some particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further particular embodiments, the apolar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

In some embodiments, the liquid phase comprises one or more protic- or aprotic-polar solvents which are preferably non-halogenated. Suitable protic- or aprotic-polar solvents which are preferably non-halogenated include, e.g., water and protic- or aprotic-polar organic solvents such as alcohol, e.g., methanol, ethanol, and the like; carboxylic acid, e.g., formic acid, acetic acid, propionic acid, and the like, ether, e.g., methyl-tert-butyl ether, tetrahydrofuran (THF), dioxan and the like, ester, e.g., ethyl acetate and the like, ketone, e.g., methyl-iso-butylketone (MIBK) and the like, formamide, e.g., dimethylformamide (DMF) and the like, sulfoxide, e.g., dimethylsulfoxide (DMSO) and the like. It will be understood by those skilled in the art that the solvent employed for mixing, dispersing or dissolving the components (a) and (b) may be a single solvent, i.e., water or one of the aforementioned organic protic- or aprotic-polar solvents or may be a combination of water and one or more organic solvents, or may be a combination of one or more organic solvents.

In some particular embodiments, the polar liquid phase is or comprises at least one protic polar solvent. In other particular embodiments, the polar liquid phase is or comprises water.

The concentration of the components (a) or (b) in the liquid phase depends on the nature of the block copolymer and on factors such as the identity of the solvent or the solvent mixture. Generally, the polymer concentration falls within a range of from about 2%-wt. to about 50%-wt., alternatively from about 5%-wt. to about 40%-wt., alternatively from about 7%-wt. to about 30%-wt., or a range of from about 1%-wt. to about 40%-wt., alternatively from about 3%-wt. to about 30%-wt., alternatively from about 5%-wt. to about 20%-wt., based on the total weight of the solution of dispersion of (a) and/or (b). It will be understood by those skilled in the art that suitable ranges include any combination of the specified weight percents even if the specific combination and range is not listed herewith.

The dispersion or solution of the block copolymers (a) or (b) in the liquid phase to obtain the dispersion or solution of (a) or (b) is achieved, for example, by combining requisite amounts of the block copolymer and the solvent or solvents at a temperature of from about 20° C. to the boiling point of the employed solvent or solvents. In general, the dissolution or dispersion temperature is in a range of from about 20° C. to about 80° C., alternatively from about 20° C. to about 70° C., alternatively from about 20° C. to about 60° C., alternatively from about 25° C. to about 65° C., alternatively from about 25° C. to about 60° C. (e.g., at about 50° C.). The dispersing or dissolution time can be in the range of from approximately less than 1 minute to approximately 24 hours or longer, dependent on the temperature of the mixture.

In a particular embodiment, the dispersion or solution of the optionally functionalized block copolymer(s) (a) is a solution or dispersion of the SBC(s) and a non-polar, liquid phase and is obtained by dissolving or dispersing one or more optionally functionalized block copolymer(s) (a) in a non-polar liquid phase.

In some embodiments, the non-polar, liquid phase is formed by one or more aprotic apolar solvents which are preferably non-halogenated. Illustrative examples include hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In particular embodiments, the non-polar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further embodiments, the non-polar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

The concentration of the optionally functionalized block copolymer(s) (a) in the non-polar liquid phase depends upon the nature of the optionally functionalized block copolymer(s) (a), since the limiting concentration below which polymer gelling is non-disabling or negligible depends upon the polymer nature. The limiting concentration may also be dependent on other factors such as the identity of the solvent or the solvent mixture. Generally, the polymer concentration falls within the range of from about 0.1%-wt. to about 30%-wt., alternatively from about 0.5%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percents even if the specific combination and range is not listed herewith.

In a further particular embodiment, the dispersion or solution of the sulfonated block copolymer(s) (b) is a micellar solution of the sulfonated block copolymer(s) and a non-polar, liquid phase and is obtained by dissolving or dispersing at least one sulfonated block copolymer having at least one end block A and at least one interior block B wherein each block A contains essentially no sulfonic acid or sulfonate ester functional groups and each block B is a polymer block containing from about 10 to about 100 mol % sulfonic acid or sulfonate ester functional groups based on the number of monomer units present in the block B in a non-polar liquid phase.

In some embodiments, the non-polar, liquid phase is formed by one or more aprotic apolar solvents which are preferably non-halogenated. Illustrative examples include hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In particular embodiments, the non-polar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further embodiments, the non-polar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

The concentration of the sulfonated block copolymer(s) (b) in the non-polar liquid phase depends upon the composition of the sulfonated block polymer, since the limiting concentration below which polymer gelling is non-disabling or negligible depends upon the polymer composition. The limiting concentration may also be dependent on other factors such as the identity of the solvent or the solvent mixture. Generally, the polymer concentration falls within the range of from about 0.1%-wt. to about 30%-wt., alternatively from about 0.5%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percents even if the specific combination and range is not listed herewith.

Alternatively, the micellar solution/dispersion of the sulfonated block copolymer may be prepared by sulfonating a corresponding block copolymer precursor in the manner described in the foregoing.

The coating and film-casting composition of the present disclosure is advantageously obtained by providing components (a) and (b) in separate solutions or dispersions and admixing the solutions and/or dispersions, i.e., by adding a solution or dispersion of (a) to a solution or dispersion of (b), by adding a solution or dispersion of (b) to a solution or dispersion of (a), or by separately but simultaneously adding a solution or dispersion of (a) and a solution or dispersion of (b) to a liquid phase. The solutions or dispersions (a) and (b) are normally combined at room temperature (about 20 to 25° C.). It has been observed in some cases that the combination of the solutions and/or dispersions of (a) and (b) may cause the temperature to increase. It will be understood by those skilled in the art that an increase in temperature may be controlled by the rate at which one of the solutions and/or dispersions of (a) and (b) is combined with the other solution or dispersion, and may be countered by cooling.

Upon combining the solution or dispersion of (a) and the solution or dispersion of (b) the viscosity may decrease. In some cases, the decrease in viscosity is temporary. It will be understood by those skilled in the art that a decrease in viscosity which may interfere with handling of the coating and film-casting composition can be alleviated by employing solutions or dispersions of higher concentration.

It has been observed that the quality of the film may be influenced by the homogeneity of the coating and film-casting composition. Thus, admixture of the dispersion or solution of the components (a) and (b) is advantageously aided by means of suitable mixing equipment or homogenizers known in the art. In most embodiments, conventional tank or pipe mixing procedures will be suited to obtain a composition of adequate homogeneity. In some embodiments it may be advantageous to mix the dispersion or solution of the components (a) and (b) in a conventional homogenizer. Those having skill in the art will appreciate that the thoroughness of mixing may also be facilitated by decreasing the amount of the component (a) and/or (b) in their respective solution or dispersion, and/or in the composition comprising (a) and (b). The choice of suitable equipment and concentrations will generally depend on ecologic and economic factors.

C.1 Optional Additives

The coating dispersions according to the present disclosure may include further additives known in the art to facilitate the preparation and/or use of the coating or film-casting composition, or to modify the properties of the resulting coating or film, e.g., surfactants, viscosity modifiers, plasticizing agents, stabilisers to help protect the polymer chains from degradation for example caused by UV light or oxidation, fillers, dyes, and matting agents or delustrants.

Suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anyhydride, melissic acid, myristic acid, oleic acid, palmitic acid, phosphoric acid, phthalic acid, ricinoleic acid, sebacic acid, stearic acid, succinic acid, 1,2-benzenedicarboxylic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex™ esters from Noveon, Inc.), polyethylene glycol dibenzoate, 2,2,4-trimethyl-1,3-pentanediol monoisobutyrate benzoate, 2,2,4-trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl ($C_7/C_9$) benzyl phthalate, dimethoxyethyl phthalate, 7-(2,6,6,8-tetramethyl-4-oxa-3-oxo-nonyl)benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% chlorine, o,p-toluenesulfonamide, N-ethyl p-toluene sulfonamide, N-cyclohexyl p-toluene sulfonamide, sulfonamide-formaldehyde resin, and the like, and mixtures thereof. Other suitable plasticizers known to those skilled in the art include castor oil, sunflower seed oil, soybean oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Dibenzoate esters are of particular interest in personal care applications as replacements for more hazardous components. Dibenzoate esters increase film flexibility and improve the dried film's resistance to moisture. Suitable dibenzoate esters include those set forth heretofore as well as the preferred p-aminobenzoic acid (PABA) esters, which are known to absorb UV (ultraviolet) radiation in the UVC band or region of the spectrum.

Examples of suitable reactive plasticizers include compositions and mixtures having ethylenic unsaturation, such as triallyl trimellitate (TATM), Stepanol PD-200LV (a mixture of (1) unsaturated oil and (2) polyester diol reaction product of o-phthalic acid and diethylene glycol from Stepan Company), and the like, and mixtures thereof. Other suitable reactive plasticizers include epoxidized plasticizers, including certain monofunctional and polyfunctional glycidyl ethers such as Heloxy™ Modifier 505 (polyglycidyl ether of castor oil) and Heloxy™ Modifier 71 (dimer acid diglycidyl ether) from Shell Chemical Company, and the like, and mixtures thereof.

Examples of suitable flame retardant plasticizers include phosphorus-based plasticizers such as cyclic phosphates, phosphites, and phosphate esters, exemplified by Pliabrac™ TCP (tricresyl phosphate), Pliabrac™ TXP (trixylenyl phosphate), Antiblaze™ N (cyclic phosphate esters), Antiblaze™ TXP (tar acid, cresol, xylyl, phenol phosphates), and Antiblaze™ 524 (trixylyl phosphate) from Albright & Wilson Americas; Firemaster™ BZ 54 (halogenated aryl esters) from Great Lakes Chemicals; chlorinated biphenyl, 2-ethylhexyl diphenyl phosphate, isodecyl diphenyl phosphate, triphenyl phosphate, cresol diphenyl phosphate, p-t-butylphenyl diphenyl phosphate, triphenyl phosphite, and the like. Other examples of phosphorus-based plasticizers include chlorinated alkyl phosphate esters such as Antiblaze™ 100 (chloro alkyl diphosphate ester) from Albright & Wilson Americas; alkyl phosphates and phosphites such as tributyl phosphate, tri-2-ethylhexyl phosphate, and triisoctyl phosphite; other organophosphates and organophosphites such as tributoxy ethylphosphate; other phosphates and phosphonates such as chlorinated diphosphate and chlorinated polyphosphonate; and the like. Mixtures can also be used.

Examples of suitable wetting, emulsifying, and conditioning plasticizers include alkyloxylated fatty alcohol phosphate esters such as oleth-2 phosphate, oleth-3 phosphate, oleth-4 phosphate, oleth-10 phosphate, oleth-20 phosphate, ceteth-8 phosphate, ceteareth-5 phosphate, ceteareth-10 phosphate, PPG ceteth-10 phosphate, and the like, and mixtures thereof.

In some embodiments, one or more antioxidants selected from anti-oxidants based on t-butylated phenols, UV absorbers based on benzotriazoles and hindered amine light stabilisers (HALS) are employed at a level of from about 0.1 to about 0.4%-wt. per antioxidant.

Matting agents or delustrants are commonly added to the compositions where they are intended as coating formulations for textiles, usually to decrease surface gloss and improve opacity, but they can also reduce the tendency of the coated surface to stick or "block" to another surface, or to itself. Blocking can occur, for example, when soft or unduly tacky coatings come into contact with other surfaces under pressure or at elevated temperatures. Such conditions might arise for example when tightly wound rolls of fabric or film or stacked garments are stored or transported in excessive heat or humidity, or if normally suitable coatings are severely degraded e.g. by hydrolysis. The selection of matting agent is important because it may have a deleterious effect on the moisture-vapor permeability of the solid membranes, especially at high loadings. If matting particles are too large or coarse or poorly wettable, they may cause gross defects such as pinholes or cracks in the coating, which might increase moisture-vapor permeability of the film or coating but, e.g., at the expense of its ability to resist penetration of harmful chemicals and gasses. Conversely, if the particles are too fine and packed close together or form overlapping platelets, they can impede the flow of moisture-vapor. In some embodiments, matting agents based on organically-coated, precipitated silica with particle size of from 2 to 5, e.g. 2 to 4 µm, are employed, e.g., in amounts of from about 10 to about 20%-wt. based on the total dry weight of the block copolymer components (a) and (b).

Further additives, e.g., colorants, pigments or flame retardants may be incorporated in the coating dispersions of the present disclosure before they are cast as coatings. Cheapening fillers may also be included, but are not normally used in high performance coatings and films for WBF.

Moreover, the coating dispersions can comprise additives such as activators, curing agents, stabilizers such as Stabaxol™ P200, neutralizing agents, thickeners, coalescing agents such as di(propylene glycol) methyl ether (DPM), slip and release agents, antimicrobial agents, surfactants such as Pluronic™ F68-LF and IGEPAL™ CO630 and silicone surfactants, metals, antioxidants, UV stabilizers, antiozonants, and the like, can optionally be added as appropriate before and/or during the processing of the coating and film-casting compositions of this disclosure into finished products as is well known to those skilled in the art.

D. Films

The dispersions or solutions of the present disclosure generally may have a solids content up to about 70%-wt. although the films may not necessarily be prepared from dispersions having the highest levels of solids. However, dispersions or solutions of the present disclosure in which the solids levels and the concentrations are as high as possible are advantageous for storage or transport of the dispersions and solutions to minimize storage volume and shipping costs. Also, storage- and/or transport-grade dispersions and solutions can desirably be diluted prior to final use to a solids content or viscosity level which is suited for the purposes of a particular application. The thickness of the film to be prepared and the method of applying the composition to a substrate will usually dictate the solids level of the dispersion and the viscosity of the solution. When preparing films from a dispersion according to the disclosure, the solids content of the dispersion generally will be from 5 to about 60%-wt., preferably from about 10 to about 50%-wt., or from about 15 to about 45%-wt.

In general, the components (a) and (b) may be present in the films in a weight ratio of from about 0.1:1 to 10:1, or from 0.2:1 to 7:1, or from 0.5:1 to 5:1. It will be understood by those skilled in the art that suitable weight ratio ranges include any range delineated by a combination of any one of the lower and upper limits even if the specific combination is not expressly listed herewith.

In some particular embodiments of the films, the components (a) and (b) are present in a weight ratio of 4:1 to 1:4, or of 7:3 to 3:7. In other particular embodiments, the components (a) and (b) are present in the film in a weight ratio of 1:4 to 1:2.

The thickness of the films for the applications described herein is typically from 5 to 100 µm, e.g., from 10 to 90 µm, or from 15 to 35 µm.

D.1 Coatings and Coated Articles

The coating dispersions and solutions of the present disclosure are generally employed to provide coated articles having a coating comprising a) at least one styrenic block copolymer which is optionally functionalized with functional groups different from sulfonic acid or sulfonate ester functional groups, b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1.

Substrates which may be coated with the coating dispersion according to the present disclosure include natural and synthetic, woven and non-woven materials as well as substrates made of one or more of such materials. The shape and form of the substrate may vary broadly, and include fibers, films, textiles, leather and wood parts or constructs.

Any fibrous material can be coated, impregnated or otherwise treated with the compositions of this disclosure by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The methods available for manufacturing such coated articles are in principle known in the art and include, for example, direct coating, transfer coating, and a number of different film lamination processes. In a direct coating method, a coating composition of the present disclosure is cast onto the appropriate substrate, usually a textile, and subsequently dried, and optionally cured or crosslinked, e.g. under controlled conditions of temperature and dwell time or throughput. This provides a coated layer comprising the components (a) and (b) on the substrate. The coated layer is typically non-microporous.

In this method, the coated layer may be provided either directly on the substrate, or the substrate may comprise one or more additional layers, e.g. polymer layers, on its surface. Moisture-vapor permeable tie or base coats and intermediate layers may, for example, be present on the substrate surface. For instance, the substrate may be a textile having a layer of foamed, microporous or hydrophilic polymer. Thus, multilayer coatings having several coated layers (and/or film layers) are provided. Typically, the coated layer of the disclosure is provided as the outermost layer.

In a transfer coating method, the composition of the disclosure is cast onto a removable release substrate, e.g. release paper and then dried and optionally cured to provide a film on the release substrate. The film is typically non-microporous. The release substrate is, for example, a siliconised paper or blanket. The film may be stored and/or transported in this format prior to further use, or the release substrate may be removed prior to storage or use.

The film can typically then be bonded to a material using thermal energy, or by using a layer of adhesive. The layer of adhesive may be applied to either the film or the material or both the film and the material. The adhesive layer may be either continuous or discontinuous and typically comprises a foamed, microporous or hydrophilic polymer formulation. The release substrate is removed either before or after application of the film to the material.

Directly coated layers as well as multi-layer coatings may be produced in this way. For example, the film which is applied to the material may be a pre-formed multi-layer film, and/or additional layers may be present on the material prior to application of the film of the disclosure. These additional layers may be moisture-vapor permeable tie or base coats and intermediate layers. Thus, multi-layer films, and materials coated with multiple film layers (and/or coated layers), are provided. Typically, the film layer comprising the polymer of the disclosure is provided as the innermost layer.

It will be understood by those skilled in the art that the coated articles in accordance with the present disclosure may comprise a coated layer or film layer obtained from the disclosed coating composition in combination with a hydrophilic layer. Suitable hydrophilic layers are, for example, layers containing from 30 to 60% by weight of poly(ethylene oxide) soft segments as, e.g., described in U.S. Pat. No. 4,190,566. The coated layer or film layer in accordance with the present disclosure is typically the outermost layer.

Combinations of one or more inner layers comprising a coating according to the present disclosure with conventional, less hydrophobic layers may be anisotropic, and may show a directional effect of moisture-vapor flow on the water vapor resistance. This effect is most obvious in bi- and multilayer systems, and the magnitude of the effect is significant in the context of the overall breathability of the materials. Synergy may be observed when the vapor flow occurs first through the film in accordance with the present disclosure, which results in lower than expected water vapor resistance values for the composite. Conversely, vapor flow that occurs first through a less hydrophobic layer may have an undermining effect on the layer comprising a coating according to the present disclosure, which results in higher than expected water vapor resistance values. This additional control feature for moisture-vapor flow may be usefully incorporated into the design of multilayer films, other materials such as coated fabrics and end products such as garments.

Thus, the coatings according to the present disclosure can be used to provide breathable materials for clothing and footwear, including industrial or military clothing, survival suits, foul weather clothing which may include heavy-duty foul weather clothing as well as sportswear and leisure wear, and walking boots. Tents and bivouac bags may also be provided. They may also be used for other flexible substrates such as natural and synthetic leather. In addition, coated fabrics in accordance with the disclosure may be incorporated into protective blankets for animals, mattress covers, bed sheets and other similar items such as seat covers. One having ordinary skill in the art will readily appreciate that the films disclosed herein may be employed successfully in any application which requires moisture vapor transport and in which elasticity of the material is desirable.

D.2 Membranes

The film-casting dispersions and solutions of the present disclosure are suitable to produce an elastic membrane comprising a) at least one styrenic block copolymer which is optionally functionalized with functional groups different from sulfonic acid or sulfonate ester functional groups, b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1, which have no more than 50% set at an elongation of 50% and which have a moisture-vapor transmission rate (MTR) of at least 1,000 g/m$^2$/day, determined as defined hereinafter.

The film-casting solutions or dispersions of the present disclosure can be used to prepare either flat or hollow fiber membranes according to conventional casting techniques. Specifically, membranes are suitably prepared by a process comprising casting a layer of the film-casting solutions or dispersions on a support; and removing the solvent or diluent portion of the film-casting solutions or dispersions by vaporization.

The vaporization of solvent in step (ii) can be carried out suitably at normal temperature, i.e., 20-25° C., or at an elevated temperature, and for a period of time. In general, the temperature may range from 20° C. to 180° C. for a period of at least 30 sec.

D.3 Film Properties

The films produced using a coating dispersion or solution in accordance with the present disclosure generally are elastic and have a good balance of low swell and high moisture-vapor permeability properties. In general, the properties of the films may be tailored to meet the demands of a particular application, for example, by varying one or more of the following parameters:

The weight ratio of the components (a) and (b): For example, by increasing the amounts of component (a) relative to the amount of component (b) the capacity of the films to take up water can be decreased, whereas by increasing the amounts of component (b) relative to the amount of component (a) the water transport capacity of the films generally can be increased.

The presence or absence of functional groups: For example, in some cases introducing a maleic anhydride functionalized SBC in or as component (a) may improve the strain and modulus properties of the films under wet conditions relative to the strain and modulus properties of the respective films under dry conditions.

The arylalkylene content of the optionally functionalized SBC: For example, by decreasing the relative proportion of arylalkylene in the optionally functionalized SBC the elasticity of the film can be improved.

The ion exchange capacity (IEC) of the sulfonated block copolymer component (b): For example, by decreasing the IEC of the sulfonated block copolymer component (b) the Young's modulus of the films under dry and under wet conditions may be increased.

There are numerous other factors that will be apparent to those skilled in the art which could be expected to have an effect on the final film properties. These can include, but are not limited to, the molecular weight and polydispersity of components (a) and (b), the residual unsaturation in component (a), the extent and type of neutralization of the sulfonic acid groups in component (b), mixing conditions, and film casting conditions.

In general, the water uptake is between 10 and 90%-wt., based on the weight of the dry polymer. In some embodiments, the water uptake may be less than 10%-wt. based on the weight of the dry polymer, or less than 8%-wt., or between 0.5 and 5%-wt. under equilibrium swelling conditions.

The moisture-vapor transport rate of the films in accordance with the present disclosure may be quantified in terms of grams of water which are transported through the layer or film and an exposed surface area of 1 $m^2$ per day ($g/m^2$/day). The moisture-vapor transmission rate may be determined in accordance with ASTM E 96/E96M in an upright or inverted manner. In the upright measurement method, one surface of the layer or film is in contact with moisture-vapor whereas air having a temperature of 25° C. and a relative humidity of 50% is blown across the opposite surface. In the inverted measurement method, one surface of the layer or film is in contact with water whereas air having a temperature of 25° C. and a relative humidity of 50% is blown across the opposite surface. Deviations from ASTM E96 include a larger than recommended air gap in an upright configuration and an air flow rate that is not consistent with the standard. All reported measurements are made under consistent conditions.

Surprisingly, it has been found that the high moisture-vapor transport capability of the sulfonated block co-polymer(s) (b) can be retained by the films in accordance with the present disclosure. Moreover, the films in accordance with the present disclosure can have improved elasticity relative to the sulfonated block copolymers (b) and exhibit a surprisingly improved dimensional stability in water saturated conditions.

In other embodiments, the inverted moisture-vapor transmission rate of coatings obtained using a coating dispersion in accordance with the present disclosure is at least 8%, or at least 15%, or at least 25%, or at least 30%, of the inverted moisture-vapor transmission rate of a coating obtained using a corresponding coating composition comprising the sulfonated block copolymer component (b) but not the optionally functionalized SBC component (a). The inverted moisture-vapor transmission rate of coatings obtained using a coating dispersion in accordance with the preferred embodiment of the present disclosure is generally at least about 20,000 $g/m^2$/day, or at least about 15,000 $g/m^2$/day, or at least about 10,000 $g/m^2$/day.

The coated layers and film layers in accordance with the present disclosure have a good balance of toughness, extensibility and low modulus in the dry state which is desirable for components used in breathable fabrics and other applications described herein. The tensile strengths of these materials are typically at least 1 MPa and more usually above 5 MPa, their elongation at break is typically at least 100% and they have Young's modulus values typically in the range of from about 1 to about 400 MPa.

Due to the solid but elastic structure of the films, the films of the disclosure also have the further advantage that fluids and particulate matter such as dust or airborne contaminants, bacteria and viruses may be prevented from passing through the film. The films are therefore also useful as coatings for cleanroom workwear and numerous medical applications such as wound dressings, surgeons' gowns, drapes and other biologically protective garments or barrier covers where moisture-vapor permeability is useful and elasticity is desirable, but where a barrier to contaminants such as bacteria and viruses is required.

Moreover, due to the stretchability of embodiments of the films in accordance with the present disclosure the films are suited as coatings for physical fitness clothing and for protective garments in the civil and military sector.

E. Examples

The following examples are intended to be illustrative only, and are not intended to be, nor should they be construed as, limiting the scope of the present disclosure in any way.

E.1 Methods

Mechanical properties, including Young's modulus, tensile strength, and elongation at break, in the dry state as described herein was measured according to ASTM D412.

Mechanical properties, including Young's modulus, tensile strength, and elongation at break, in the wet state as described herein was measured similar to the method according to ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The % swelling as reported on the materials representative of the present disclosure was measured as follows. A dry swatch of film measuring approximately 9 $in^2$ was weighed and then placed in a jar with approximately 250 mL of distilled water. The swatch was allowed to hydrate for a period of at least 16 hrs. The swatch was then removed from the jar, both surfaces were blotted dry with an absorbent wipe for a period of several seconds, and the swatch was re-weighed. % swelling was calculated from the difference in the wet and dry weights divided by the original dry weight and multiplied by 100. Samples were run in at least duplicate.

The MTR as described herein was measured similar to ASTM E 96BW. The ASTM method was modified by using a smaller vial, employing 10 ml of water, and having an area of exposed membrane of 160 $mm^2$ (as opposed to 3000 $mm^2$ recommended by the ASTM method). After adding the water and sealing the vial with the membrane test specimen, the vial was inverted and placed in a controlled environment chamber where air having a temperature of 25° C. and a relative humidity of 50% was blown across the membrane. Weight loss was measured versus time, and the water transport rate was calculated on the basis of the measurements as g/m²/day. Measurements were typically taken over a period of 6-8 hours with multiple data points to insure linear transport behavior.

The degree of sulfonation as described herein and as determined by titration was measured by the following potentiometric titration procedure. The non-neutralized sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

E.2 Materials

Dispersions of Optionally Functionalized SBC

Solutions or dispersions of commercially available optionally functionalized SBC A.1 to A.9 (see Table 1 below) were prepared by adding 10 g of the optionally functionalized SBC to 90 g of cyclohexane to obtain a 10 wt % solution or dispersion. The solution or dispersion was typically placed on a tumble roller and/or a shaker table for a period of at least 24 hours. Alternatively, some solutions or dispersions were mixed by adding a stir bar to the jar and stirring with a magnetic stirrer for a period of at least 16 hours.

TABLE 1

Dispersions (a)/SBC Polymers

| Ex. No. | KRATON ® Grade | Mol. Wt. [×10³] | Total Styrene [%] | MA [%] | Diblock Content [%] | R.U. [%] |
|---|---|---|---|---|---|---|
| A.1 | A1536 | 140 | 40 | 0 | 0 | 0.14 |
| A.2 | G1637 | 114 | 19 | 0 | 10 | 0.16 |
| A.3 | G1643 | 123 | 18 | 0 | 0 | 0.14 |
| A.4 | G1650 | | 30 | 0 | <1 | |
| A.5 | G1654 | 197 | 31 | 0 | 0 | 0.14 |
| A.6 | G1657 | 145 | 13 | 0 | 30 | 0.11 |
| A.7 | MD1537 | 142 | 60 | 0 | 0 | 0.14 |
| A.8 | RP6670 | 148 | 40 | 1.1, 1.6 | 0 | 0 |
| A.9 | FG1901 | 85 | 30 | 1.7 | 0 | 0 |

Mol. Wt. = molecular weight [g/mol]
MA = maleic anhydride
R.U. = maximum residual unsaturation of the B block (b) Dispersion of a Non-Neutralized Sulfonated Block Copolymer B.1

A pentablock copolymer having the configuration A-D-B-D-A was prepared by sequential anionic polymerization where the A blocks are polymer blocks of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S—Li). The polymer styrene block was comprised only of polystyrene and had a molecular weight of 28,000 g/mol. To this solution was added another aliquot of isoprene monomer to obtain an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride). The resulting polymer (B.1) was found, by potentiometric titration, to have an "Ion Exchange Capacity (IEC)" of 2.0 meq of —SO₃H/g of polymer. The micellar solution of sulfonated polymer had a solids level of about 10%-wt. in a mixture of heptane, cyclohexane, and ethyl i-butyrate.

A micellar solution of a similar sulfonated block copolymer (B.2) but having an IEC of 1.5 meq of —SO₃H/g of polymer can be prepared in a corresponding manner.

A micellar solution of a similar sulfonated block copolymer (B.3) but having an IEC of 1.0 meq of —SO₃H/g of polymer can be prepared in a corresponding manner.

E.3 Coating and Film-Casting Compositions

The compositions were prepared by adding a solution (a) to a dispersion (b) at a temperature of about 70° F. (about 21° C.). The amounts of solution (a) and dispersion (b) were determined based on the desired weight ratio of optionally functionalized SBC to sulfonated block copolymer while maintaining a solids content of 10%-wt. in the final composition. The compositions were mixed using a jar roller for a period of at least 24 hours just prior to film casting.

Illustrative coating and film-casting compositions are compiled in the following table:

TABLE 2

| Composition/ Film No. | Dispersion/ Polymer (a) | Dispersion/ Polymer (b) | Dispersion/Polymer (a) + (b) [wt. ratio] |
|---|---|---|---|
| I.1.a | A.1 | B.1 | 10:90 |
| I.1.b | A.1 | B.1 | 20:80 |

TABLE 2-continued

| Composition/Film No. | Dispersion/Polymer (a) | Dispersion/Polymer (b) | Dispersion/Polymer (a) + (b) [wt. ratio] |
|---|---|---|---|
| I.1.c | A.1 | B.1 | 30:70 |
| I.1.d | A.1 | B.1 | 40:60 |
| I.1.e | A.1 | B.1 | 50:50 |
| I.1.f | A.1 | B.1 | 60:40 |
| I.1.g | A.1 | B.1 | 70:30 |
| I.1.h | A.1 | B.1 | 80:20 |
| I.1.i | A.1 | B.1 | 90:10 |
| I.2.a | A.2 | B.1 | 10:90 |
| I.2.b | A.2 | B.1 | 20:80 |
| I.2.c | A.2 | B.1 | 30:70 |
| I.2.d | A.2 | B.1 | 40:60 |
| I.2.e | A.2 | B.1 | 50:50 |
| I.2.f | A.2 | B.1 | 60:40 |
| I.2.g | A.2 | B.1 | 70:30 |
| I.2.h | A.2 | B.1 | 80:20 |
| I.2.i | A.2 | B.1 | 90:10 |
| I.3.a | A.3 | B.1 | 10:90 |
| I.3.b | A.3 | B.1 | 20:80 |
| I.3.c | A.3 | B.1 | 30:70 |
| I.3.d | A.3 | B.1 | 40:60 |
| I.3.e | A.3 | B.1 | 50:50 |
| I.3.f | A.3 | B.1 | 60:40 |
| I.3.g | A.3 | B.1 | 70:30 |
| I.3.h | A.3 | B.1 | 80:20 |
| I.3.i | A.3 | B.1 | 90:10 |
| I.4.a | A.4 | B.1 | 10:90 |
| I.4.b | A.4 | B.1 | 20:80 |
| I.4.c | A.4 | B.1 | 30:70 |
| I.4.d | A.4 | B.1 | 40:60 |
| I.4.e | A.4 | B.1 | 50:50 |
| I.4.f | A.4 | B.1 | 60:40 |
| I.4.g | A.4 | B.1 | 70:30 |
| I.4.h | A.4 | B.1 | 80:20 |
| I.4.i | A.4 | B.1 | 90:10 |
| I.5.a | A.5 | B.1 | 10:90 |
| I.5.b | A.5 | B.1 | 20:80 |
| I.5.c | A.5 | B.1 | 30:70 |
| I.5.d | A.5 | B.1 | 40:60 |
| I.5.e | A.5 | B.1 | 50:50 |
| I.5.f | A.5 | B.1 | 60:40 |
| I.5.g | A.5 | B.1 | 70:30 |
| I.5.h | A.5 | B.1 | 80:20 |
| I.5.i | A.5 | B.1 | 90:10 |
| I.6.a | A.6 | B.1 | 10:90 |
| I.6.b | A.6 | B.1 | 20:80 |
| I.6.c | A.6 | B.1 | 30:70 |
| I.6.d | A.6 | B.1 | 40:60 |
| I.6.e | A.6 | B.1 | 50:50 |
| I.6.f | A.6 | B.1 | 60:40 |
| I.6.g | A.6 | B.1 | 70:30 |
| I.6.h | A.6 | B.1 | 80:20 |
| I.6.i | A.6 | B.1 | 90:10 |
| I.7.a | A.7 | B.1 | 10:90 |
| I.7.b | A.7 | B.1 | 20:80 |
| I.7.c | A.7 | B.1 | 30:70 |
| I.7.d | A.7 | B.1 | 40:60 |
| I.7.e | A.7 | B.1 | 50:50 |
| I.7.f | A.7 | B.1 | 60:40 |
| I.7.g | A.7 | B.1 | 70:30 |
| I.7.h | A.7 | B.1 | 80:20 |
| I.7.i | A.7 | B.1 | 90:10 |
| I.8.a | A.8 | B.1 | 10:90 |
| I.8.b | A.8 | B.1 | 20:80 |
| I.8.c | A.8 | B.1 | 30:70 |
| I.8.d | A.8 | B.1 | 40:60 |
| I.8.e | A.8 | B.1 | 50:50 |
| I.8.f | A.8 | B.1 | 60:40 |
| I.8.g | A.8 | B.1 | 70:30 |
| I.8.h | A.8 | B.1 | 80:20 |
| I.8.i | A.8 | B.1 | 90:10 |
| I.9.a | A.9 | B.1 | 10:90 |
| I.9.b | A.9 | B.1 | 20:80 |
| I.9.c | A.9 | B.1 | 30:70 |
| I.9.d | A.9 | B.1 | 40:60 |
| I.9.e | A.9 | B.1 | 50:50 |
| I.9.f | A.9 | B.1 | 60:40 |
| I.9.g | A.9 | B.1 | 70:30 |
| I.9.h | A.9 | B.1 | 80:20 |
| I.9.i | A.9 | B.1 | 90:10 |

Corresponding compositions II.1.a to II.9.i employ as dispersion (b) a dispersion of the sulfonated block copolymer B.2 instead of the dispersion of B.1. Correspondingly, compositions III.1.a to III.9.i employ as dispersion (b) a dispersion of the sulfonated block copolymer B.3 instead of the dispersion of B.1.

E.4 Films

Films of the compositions prepared as described above were cast against silicanized glass plates at room temperature in a box with a nitrogen purge. Films were allowed to dry in this manner for a period of at least 16 hours. No further post-treatments of the film were performed except those specifically required by particular testing procedures. Typical film thicknesses obtained by this procedure range from 1.5 to 2.0 mils (37-50 microns).

Some of the properties of representative films obtained from coating and film-casting compositions enumerated in Table 2 are summarized in the following Tables 3 to 9:

TABLE 3

Wet and Dry Mechanical Properties

| | Film No.: | | | | | |
|---|---|---|---|---|---|---|
| | I.6.e wet | I.6.e dry | I.4.e wet | I.4.e dry | I.9.e wet | I.9.e dry |
| Peak Load [lbf] | 0.375 | 0.331 | 1.061 | 0.879 | 0.601 | 0.551 |
| Stress @ Break [psi] | 1529 | 1298 | 4286 | 3510 | 2525 | 2205 |
| Strain @ Break [%] | 533 | 502 | 542 | 537 | 511 | 524 |
| Strain @ Yield [%] | nd | nd | 545 | 537 | 500 | 521 |
| Stress @ Yield [psi] | nd | nd | 4326 | 3503 | 2364 | 2126 |
| Modulus [psi] | 719 | 640 | 2236 | 2241 | 1102 | 1136 | nd = not determined

TABLE 4

Ratio Dependence of Water Uptake, Dry Modulus, Set at 50% Elongation, and MTR

| Film No. | Water Uptake [%] | Dry Modulus [psi] | Set [%] | MTR [g/m²/day] |
|---|---|---|---|---|
| B.1 | ~95 | ~45000 | 38.9 | ~28000 |
| I.6.a | 68 | 48461 | 42.1 | 28428 |
| I.6.b | 72 | 32249 | 36.6 | 23611 |
| I.6.c | 66 | 1202 | 33.4 | 23322 |
| I.6.d | 55 | 482 | 21.5 | 24059 |
| I.6.f | 32 | 721 | 19.9 | 15212 |
| I.6.g | 19 | 530 | 13.9 | 5164 |
| I.6.h | 17 | 628 | 7.5 | 2186 |

TABLE 5

Water Uptake, Dry Modulus, Set at 50% Elongation, and MTR of various Films

| Film No. | Water Uptake [%] | Dry Modulus [psi] | Set [%] | MTR [g/m²/day] |
|---|---|---|---|---|
| I.8.d | 58 | 12811 | 33.4 | 25722 |
| I.3.d | 58 | 9245 | 38.5 | 19912 |
| I.5.h | 26 | 1406 | 20.5 | 4507 |
| I.5.g | 36 | 1217 | 16.9 | 27874 |

TABLE 6

Impact of Component (a) on Various Properties

| | Film No.: | | | | | | |
|---|---|---|---|---|---|---|---|
| | I.5.d | I.1.d | I.2.d | I.3.d | I.7.d | I.8.d | I.9.d |
| 50% Set: | 21.5 | 31.5 | 30.2 | 38.5 | 37.1 | 33.4 | 29 |
| 100% Set: | 51.9 | 86.6 | 68.9 | 77 | 75.8 | 73.9 | 70.9 |
| Water Uptake [%] | 55 | 48 | 55 | 58 | 67 | 58 | nd |
| Dry Modulus [psi] | 482 | 4861 | 4280 | 9245 | 13751 | 12811 | 1385 |
| Stress @ Break [psi] | nd | 1092 | 1168 | 711 | 1519 | 1559 | 453 |
| MTR [g/m²/day] | 24059 | 20441 | 29835 | 19912 | nd | 25722 | nd | nd = not determined

TABLE 7

Impact of Weight Ratio on Various Properties

| Film No.: | I.5.i | I.5.h | I.5.g |
|---|---|---|---|
| 50% Set: | 14.6 | 20.5 | 16.9 |
| 100% Set: | 25.3 | 45.4 | 62.9 |
| Water Uptake [%] | 17.8 | 26.4 | nd |
| Dry Modulus [psi] | 1489 | 1406 | 1217 |
| Stress @ Break [psi] | 2825 | 2615 | 2650 |
| MTR [g/m²/day] | 2136 | 4507 | 27874 | nd = not determined

TABLE 8

Impact of Weight Ratio on Various Properties

| Film No.: | I.1.i | I.1.h | I.1.g | I.1.d |
|---|---|---|---|---|
| 50% Set: | 5.8 | 12.3 | 10 | 31.5 |
| 100% Set: | 11 | 27.6 | 30.4 | 86.6 |
| Water Uptake [%] | 9.3 | 40.7 | 23.7 | 48.1 |
| Dry Modulus [psi] | 1860 | 1086 | 1775 | 4861 |
| Stress @ Break [psi] | 1963 | 1248 | 2371 | 1092 |
| MTR [g/m²/day] | nd | nd | nd | 20441 | nd = not determined

TABLE 9

Impact of Weight Ratio on Various Properties

| Film No.: | I.8.g | I.8.f | I.8.e |
|---|---|---|---|
| 50% Set: | 24.9 | 18.4 | 31.2 |
| 100% Set: | 68.9 | 52.2 | 63.4 |
| Water Uptake [%] | 71.9 | 84 | 77.4 |
| Dry Modulus [psi] | 1346 | 386 | 665 |
| Stress @ Break [psi] | 701 | 339 | 414 |
| MTR [g/m²/day] | nd | 20521 | 29672 | nd = not determined

Table 5, in particular, demonstrates some of the unique properties that can be obtained within the preferred embodiments of this disclosure. The film no. I.6.d, for example, shows that although component (a) does not by itself transport water, a significant amount of component (a) can be added to component (b) without impacting the moisture transport behavior. However, there is a dramatic decrease in modulus and an improvement in the % set at 50% elongation over the same composition range (films nos. I.6.a-I.6.d), indicating that the proper blend can provide a material with a low modulus, high elasticity, and high moisture transport. Additionally, the dimensional stability of the film can be dramatically improved without sacrificing moisture transport as evidenced by a surprising and significant reduction in swelling over the same composition range. At the low end of component (b) (films nos. I.6.g and I.6.h), it is possible to obtain a material with excellent elastic properties that still transports water. These types of materials could have specific applications in, for example, waistbands, collars, and cuffs, where low levels of moisture transport would be sufficient.

What is claimed is:
1. A film comprising
   a) at least one elastomeric styrenic block copolymer which is optionally functionalized with functional groups different from sulfonic acid or sulfonate ester functional groups,
   b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1.

2. The film of claim 1, wherein the ratio of (a) to (b) is from about 0.5:1 to about 5:1.

3. The film of claim 1, wherein the styrenic block copolymer (a) has a general configuration A-B, A-B-A, (A-B)$_n$, (A-B-A)$_n$, (A-B-A)$_n$X, (A-B)$_n$X or a mixture thereof, wherein n is an integer from about 2 to about 30, and X is the residue of a coupling agent, each A block independently is a polymer block of one or more alkenyl arenes having a number average molecular weight of from 3,000 to 60,000; and each B block independently is a polymer block of one or more conjugated dienes and from 0 to about 75%-wt. of one or more alkenyl arenes, which block contains no significant levels of olefinic unsaturation and has a number average molecular weight of from 10,000 to 300,000;

wherein the total amount of alkenyl arenes in the block copolymer (a) is from about 2 to about 75%-wt.

4. The film of claim 3, wherein the total amount of alkenyl arenes in the styrenic block copolymer (a) is from about 5 to about 65%-wt.

5. The film of claim 1 wherein the styrenic block copolymer component (a) comprises at least one S-E/B-S or S-E/P-S block copolymer which is optionally functionalized.

6. The film of claim 1 wherein the styrenic block copolymer component (a) consists of one or more non-functionalized styrenic block copolymers.

7. The film of claim 1 wherein the styrenic block copolymer component (a) consists of one or more functionalized styrenic block copolymers.

8. The film of claim 1 wherein the styrenic block copolymer component (a) consists of one or more functionalized styrenic block copolymers and one or more non-functionalized styrenic block copolymers.

9. The film of claim 1, wherein the sulfonated block copolymer (b) has a general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

10. The film of claim 9, wherein each D block of the sulfonated block copolymer (b) is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

11. The film of claim 1, having no more than 50% set at 50% elongation.

12. The film of claim 1, having a moisture vapor transmission rate of at least 1,000 g/m$^2$/day as measured by the procedure described herein.

13. The film of claim 1, wherein (a) and (b) are present in weight a ratio of from about 7:3 to 3:7.

14. A coated article comprising a substrate and a coating comprising a) at least one styrenic block copolymer which is optionally functionalized with functional groups different from sulfonic acid or sulfonate ester functional groups, b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1.

15. The coated article of claim 14, wherein the substrate is a natural or synthetic, woven and non-woven material, or a mixture thereof.

16. The coated article of claim 14, wherein the substrate is flexible or elastic.

17. The coated article of claim 14 wherein the styrenic block copolymer component (a) consists of one or more non-functionalized styrenic block copolymers.

18. The coated article of claim 14, wherein (a) and (b) are present in weight a ratio of from about 7:3 to 3:7.

19. An elastic membrane comprising a) at least one styrenic block copolymer which is optionally functionalized with functional groups different from sulfonic acid or sulfonate ester functional groups, b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1, having no more than 50% set at 50% elongation, and having a moisture vapor transmission rate of at least 1,000 g/m$^2$/day as measured by the procedure described herein.

20. The elastic membrane of claim 19 wherein the styrenic block copolymer component (a) consists of one or more non-functionalized styrenic block copolymers.

21. The elastic membrane of claim 19, wherein (a) and (b) are present in weight a ratio of from about 7:3 to 3:7.

22. A coating or film-casting composition comprising a liquid phase and a) at least one styrenic block copolymer which is optionally functionalized with functional groups different from sulfonic acid or sulfonate ester functional groups, b) at least one sulfonated block copolymer having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, and wherein (a) and (b) are present in weight a ratio of from about 0.1:1 to about 10:1.

23. The composition of claim 22, wherein the liquid phase comprises one or more organic solvents.

24. The composition of claim 23, wherein the liquid phase comprises one or more aprotic organic solvents.

25. The composition of claim 22 having a solids content of no more than 50%-wt.

26. The composition of claim 25, which is in form of an aqueous or non-aqueous dispersion.

27. The composition of claim 25, which is in form of a non-aqueous dispersion or solution.

28. The coating or film-casting composition of claim 22 wherein the styrenic block copolymer component (a) consists of one or more non-functionalized styrenic block copolymers.

29. The coating or film-casting composition of claim 22, wherein (a) and (b) are present in weight a ratio of from about 7:3 to 3:7.

* * * * *